(12) United States Patent
Facchetti et al.

(10) Patent No.: US 12,307,991 B2
(45) Date of Patent: May 20, 2025

(54) ELECTROWETTING ON DEMAND SYSTEM WITH ORGANIC TRANSISTORS

(71) Applicant: Flexterra, Inc., Skokie, IL (US)

(72) Inventors: Antonio Facchetti, Skokie, IL (US); Yu Xia, Skokie, IL (US); Shaofeng Lu, Skokie, IL (US); Shiuan-Iou Lin, Zhubei (TW); Liang-Je Lai, Zhubei (TW)

(73) Assignee: Flexterra, Inc., Skokie, IL (US)

( * ) Notice: Subject to any disclaimer, the term of this patent is extended or adjusted under 35 U.S.C. 154(b) by 0 days.

(21) Appl. No.: 18/686,467

(22) PCT Filed: Apr. 21, 2022

(86) PCT No.: PCT/US2022/025836
§ 371 (c)(1),
(2) Date: Feb. 26, 2024

(87) PCT Pub. No.: WO2023/027779
PCT Pub. Date: Mar. 2, 2023

(65) Prior Publication Data
US 2024/0363082 A1 Oct. 31, 2024

Related U.S. Application Data

(60) Provisional application No. 63/237,376, filed on Aug. 26, 2021.

(51) Int. Cl.
*G09G 3/34* (2006.01)

(52) U.S. Cl.
CPC ..... *G09G 3/348* (2013.01); *G09G 2300/0426* (2013.01); *G09G 2300/08* (2013.01); *G09G 2330/04* (2013.01)

(58) Field of Classification Search
CPC .......... G09G 3/348; G09G 2300/0426; G09G 2300/08; G09G 2330/04
See application file for complete search history.

(56) References Cited

U.S. PATENT DOCUMENTS

| | | |
|---|---|---|
| 2003/0173890 A1 | 9/2003 | Yamazaki et al. |
| 2013/0329274 A1 | 12/2013 | Yang et al. |
| 2015/0277101 A1 | 10/2015 | Novoselov et al. |
| 2018/0136114 A1* | 5/2018 | Delattre ............. G01N 15/1433 |
| 2019/0107709 A1 | 4/2019 | Hara et al. |
| 2020/0012089 A1* | 1/2020 | Hadwen ............... G02B 26/005 |
| 2020/0312889 A1* | 10/2020 | Hachiya .............. H01L 27/1225 |
| 2020/0348576 A1* | 11/2020 | Visani ............... C23C 16/45525 |
| 2021/0231606 A1* | 7/2021 | Gupta ............. G01N 27/44791 |

OTHER PUBLICATIONS

International Search Report and Written Opinion in International Patent Application No. PCT/US2022/025836, dated Aug. 2, 2022.

* cited by examiner

*Primary Examiner* — Michael A Faragalla
(74) *Attorney, Agent, or Firm* — McDonnell Boehnen Hulbert & Berghoff LLP

(57) ABSTRACT

An active matrix fluidic droplet driver system comprising a plurality fluidic droplet pixels driver comprising organic thin-film transistors is described. Each fluidic droplet pixel driver includes an organic thin film transistor and a pixel electrode where the gate dielectric layer and the pixel dielectric layer comprise an organic polymer. The active matrix fluidic droplet driver system can be fabricated on plastic substrates at low temperature and operates at no more than 40 V.

20 Claims, 7 Drawing Sheets

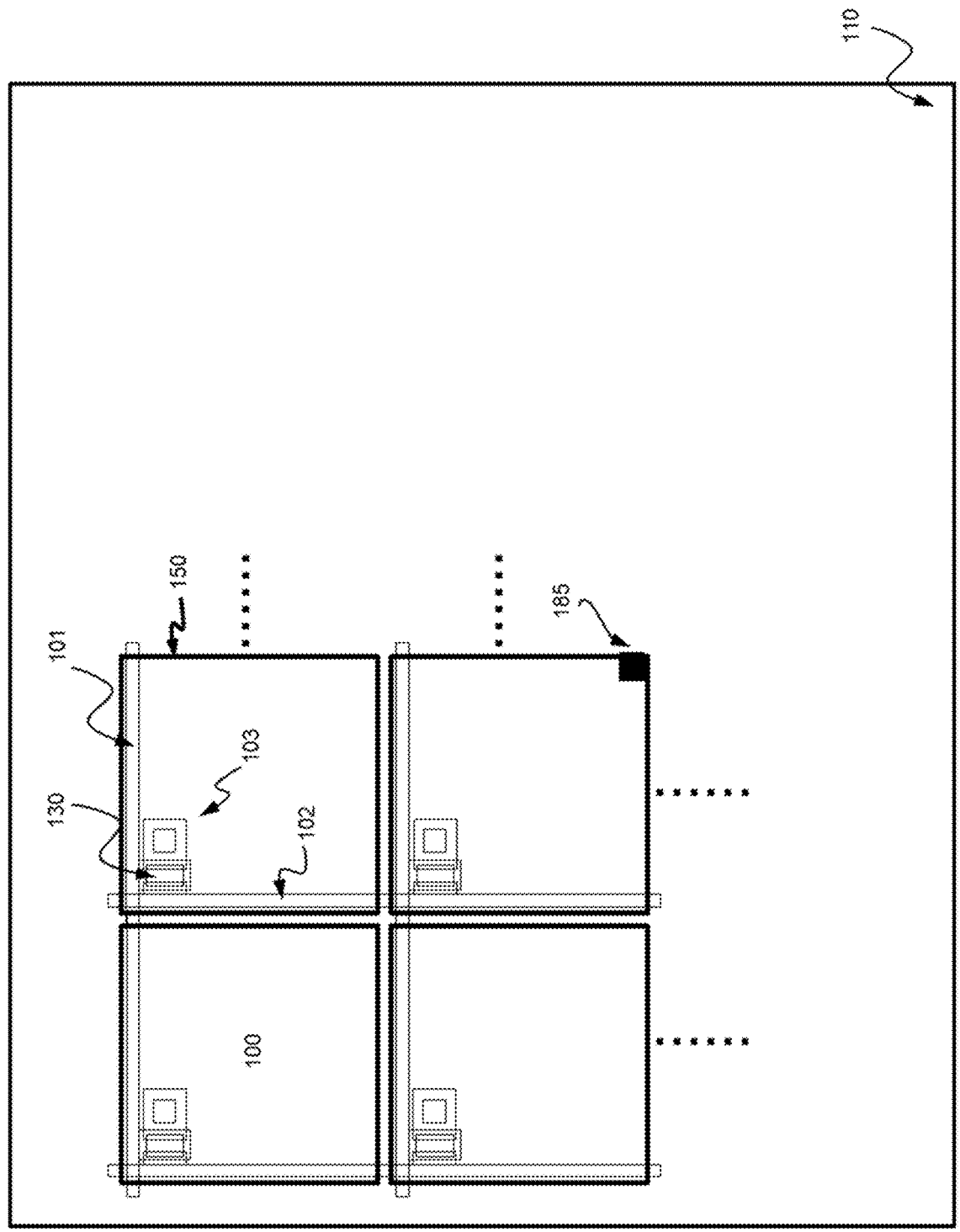

ELECTROWETTING ON DEMAND SYSTEM WITH ORGANIC TRANSISTORS

CROSS-REFERENCE TO RELATED APPLICATIONS

This application is a U.S. National Stage Entry of International Patent Application no. PCT/US2022/025836, filed Apr. 21, 2022, which claims the benefit of priority of U.S. Provisional Application No. 63/237,376, filed Aug. 26, 2021, incorporated herein by reference in its entirety.

BACKGROUND OF THE DISCLOSURE

Field of the Disclosure

The present disclosure relates to electrowetting on demand (EWOD) devices and methods for making and using the same.

Technical Background

Digital microfluidic movement of aqueous droplets has been considerably investigated as a platform for the manipulation of chemical and biomedical fluids on biochips. See, e.g., Lie et al., Lab Chip, 20, 1705-1712 (2020); Hadnen et al., Lab Chip, 12, 3305-3313 (2012); Fair et al., Nanofluidics 3 (3), 245-281 (2007). Typical ultimate goals of this technology include decreasing laboratory reactant consumption, simplifying analytical procedures and allowing for miniaturization of fluid handling equipment, which can be important for applications in drug delivery, medical diagnosis, point of care, and environmental monitoring. An electrowetting on demand (EWOD) device is a fluid droplet actuator based on the control electrical charges at the interface of a fluid and an insulator, typically using buried electrodes. See, e.g., Pollack et al., Applied Physics Letters 77 (11), 1725-1727 (2000). Fluid droplets of sizes ranging from microliters to nanoliters can be moved to a precise location, which is not generally possible by use of other microfluidic approaches. See P. Tabeling, Introduction to Microfluidics, Oxford University Press, New York (2005). EWOD actuators can transport, split, mix, and dispense droplets from reservoirs having the same or different types of fluids. This approach to control of liquids can provide more flexibility and better choices for multiple applications, such as clinical diagnostics, proteomic sample preparation, polymerase chain reaction, DNA ligation and sequencing, as well as other complex chemical, biochemical or biophysical analysis. See, e.g., Fair, Microfluid. Nanofluid., 3, 245-281 (2007). For a variety of biomedical and biochemical research fields, chemical reagents and analytes are among the most expensive items used in experiments when compared to devices and other costs. Thus, miniaturized devices with using sub-microliter liquid samples can beneficially result in high throughput, fast diagnosis, and wide implementation, all while containing costs.

Electrowetting is a phenomenon in which an electric field changes the surface energy at the interface between a solid electrode and a liquid, inducing a driving force. The model of electrowetting on dielectric that relates the applied voltage, V, and the droplet contact angle change is given by the Lippmann-Young equation, $\cos\theta = \cos\theta_0 + [(1/y_{SL})(k\varepsilon_0)/2t]V^2$, where $\theta$ and $\theta_0$ are the contact angles with and without applying a voltage bias respectively, $y_{SL}$ is the interfacial tension between the droplet and filler medium, k is the dielectric constant of the dielectric layer, $\varepsilon_0$ is the permittivity of vacuum, and t is the thickness of the insulator. The variation of contact angle or wettability shift is caused predominantly by the charge-induced change in the solid-liquid interfacial tension. Thus, since application of a voltage changes the contact angle of the droplet and the interfacial tension between the electrode and droplet, an actuator using EWOD can manipulate droplets in micro-channels. When different voltages are applied on an adjacent electrodes, the solid-liquid interfacial tension ($y_{SL}$) difference between the two electrodes induces a wetting force ($f_E$) distorting and even moving the droplet if the force exceeds drag forces and contact-line friction. Electrowetting actuators require a droplet to overlap the adjacent electrode when the droplet rests on the biased electrode, so that the droplet can response to the voltage applied on the adjacent electrode. Therefore, interleaved electrodes are often used to facilitate the droplet actuation.

There are several factors affecting EWOD devices, however. Operation at low voltages is important, which is affected by the thickness and dielectric constant of the pixel dielectric, and the identities of the fluid and, if present, any filler medium. Regardless of the dielectric effects, the threshold voltage ratio for actuation in air to actuation in oil is 1.9-2.5, thus, several EWOD devices operate in a silicone oil medium (e.g., 1.5 cSt in viscosity; $y_{SL}$=47 mN/m). Several inorganic dielectrics have been used, including silicon oxide ($SiO_2$, k=3.9), silicon nitride ($SiN_x$, k=7.5), and tantalum pentoxide ($Ta_2O_5$, k=23), each typically coated with a hydrophobic coating such as parylene C (k=3) or an organic fluoropolymer such as a perfluoro (1-butenyl vinyl ether) homocyclopolymers (CYTOP, k=2.8). However, no examples of organic pixel dielectrics have been reported, nor have examples in which the functions of the pixel dielectric and the hydrophobic coating can be combined in the same layer.

In first-generation and typical EWOD devices, the bottom substrate includes a patterned conductive layer (pixel electrodes) on a rigid substrate, typically glass, forming an array of individual electrodes to which voltage biases can be individually applied by external means such as from a PCB, for example as disclosed in U.S. Pat. No. 8,349,276. The electrodes are covered with a thin hydrophobic dielectric layer. Selective application of voltages to different pixel electrodes with respect to a top (e.g., unpattered) electrode/substrate is used to manipulate droplets. The typical pixel electrode sizes are in the range of 750-1500 µm, which allows manipulation of droplets of volumes in the nano-to-microliter range. See, e.g., Moon et al., Journal of Applied Physics 92 (7), 4080-4087 (2002). EWOD devices with electrodes ~35 µm and driving droplet volumes of ~30 pL, have been demonstrated with driving voltages of 30 V. Lin at al., Sensors and Actuators B, 150 (1), 465-470 (2010). Optimization of the pixel electrode insulating layers enabled further scaled (<21 µm electrodes), low voltage (<20 V), and picoliter (5-12 pL) EWOD devices. Lin et al. Sensors and Actuators B, 173, 338-345 (2012).

The EWOD devices described above are passive-array, or matrix, and have a number of limitations since the number of independently addressable electrodes is limited by the number of electrical connections that can be made to the device (thus limiting the number of separately-applicable voltages). Accordingly, these devices are usually very simple in functionality and scope, where for instance a droplet is moved linearly along a linear track of electrodes or multiple electrodes addressed simultaneously from a single connection. To enhance device functionality, multiple electrodes can be addressed with far fewer connections by using transistor active matrix switching, like that used to drive flat panel displays. A 1024-electrode droplet processor using a CMOS (complementary metal-oxide semiconductor) structure and having the switching electronics embedded below the surface has been demonstrated. See Gascoyne at al., Lab Chip, 4, 299-309 (2004). These early devices incorporated addressing logic and a square-wave oscillator, and also enabled generation of the high voltages required for droplet manipulation (100 V). Other CMOS-based systems have been fabricated to manipulate multiple electrodes, typically for dielectrophoresis (DEP) applications, with a prominent example demonstrating microfluidic (320×320 pixel array) DEP chips for the programmable detection and manipulation of cells. See Manaresi et al., IEEE J. Solid-State Circuits, 38, 2297-2305 (2003). Devices including a 128×256 pixel array for reduced-voltage (5 V) DEP droplet manipulation have also been manufactured using CMOS. See Hunt, Lab Chip, 8, 81-87 (2008). However, EWOD devices based on CMOS remain limited in their applicability since they are expensive to manufacture via high-temperature and vapor phase processes, they have limited size and voltage-handling capability and, perhaps most importantly, they are not optically transparent. Thus, a much more appealing technology is the use of thin film transistors (TFTs) using such as those used in liquid crystal displays (LCDs). These devices are also optically transparent since they are fabricated on a glass substrate and the manufacturing processes are well established for large-area devices. Thus, TFTs were incorporated into electrowetting arrays resulted in an active matrix (AM) EWOD (AM-EWOD) chip. See Hadwen et al., Lab Chip, 12, 3305-331 (2012), which represented a new device concept for digital microfluidics. In an AM-EWOD, the patterned electrodes of a conventional EWOD device are replaced by a thin film transistor (TFT) array, as found in a LCD, facilitating independent control of each electrode. The arrays can have many thousand individually addressable electrodes, are fully reconfigurable and can be programmed to support multiple simultaneous operations. However, these active matrix technologies use expensive substrates, and material deposition particularly of the dielectric layers, is performed using costly vapor phase processes such as chemical vapor deposition (CVD) or sputtering. Moreover, the materials typically require post-film deposition high-temperature (>200-400° C.) annealing steps, which strongly limit applicability to inexpensive plastic substrates.

SUMMARY

In light of the foregoing, the present teachings provide active-matrix EWOD devices that can in various aspects provide a number of advantages such as one or more of facile production, reduced weight, reduced costs, lower operating voltages, and even in some cases mechanical flexibility, specifically, via integrating organic thin-film transistors having a solution-processed polymeric gate dielectric and pixel electrode architectures having a solution-processed polymeric pixel dielectric.

One key advantage of this various devices according to the present teachings is the possibility of device fabrication at low temperature (<200° C.) and the enablement of operation on inexpensive plastic substrates.

One aspect of the disclosure is a fluidic droplet pixel, the fluidic droplet pixel comprising:
- a first platform comprising a first substrate, a first pixel electrode disposed on the first substrate, and a first pixel dielectric layer disposed on the first substrate, the first pixel electrode being disposed between the first substrate and the first pixel dielectric layer, the first platform presenting a first hydrophobic surface opposite the first substrate,
- the first platform further comprising an organic thin film transistor (OTFT) comprising source and drain electrodes separated by an organic semiconductor channel, and a gate electrode separated by the source and drain electrodes by a gate dielectric layer, said organic thin film transistor being disposed outside said fluidic channel between the first substrate and the first hydrophobic surface; and
- a second platform comprising a second substrate, a second pixel electrode disposed on the second substrate, and a second pixel dielectric layer disposed on the second substrate, the second pixel electrode being disposed between the second substrate and the second pixel dielectric layer, the second platform presenting a second hydrophobic surface opposite the second substrate;
- the first hydrophobic surface and the second hydrophobic surface defining boundaries of a fluidic channel between the first platform and the second platform; and
- wherein each of the gate dielectric layer, the first pixel dielectric layer, and the second pixel dielectric layer comprise an organic polymer.

In another aspect In one aspect, the present disclosure provides an active matrix fluidic droplet driver system comprising a plurality of fluidic droplet pixels as described herein.

BRIEF DESCRIPTION OF THE DRAWINGS

It should be understood that the drawings described below are for illustration purpose only. The drawings are not necessarily to scale, with emphasis generally being placed upon illustrating the principles of the present teachings. The drawings are not intended to limit the scope of the present teachings in any way

FIG. 1B is a schematic plan view of active matrix fluidic droplet driver system having a 2×2 array of pixels each as schematically exemplified in FIG. 1A.

DETAILED DESCRIPTION

Figure 1A:
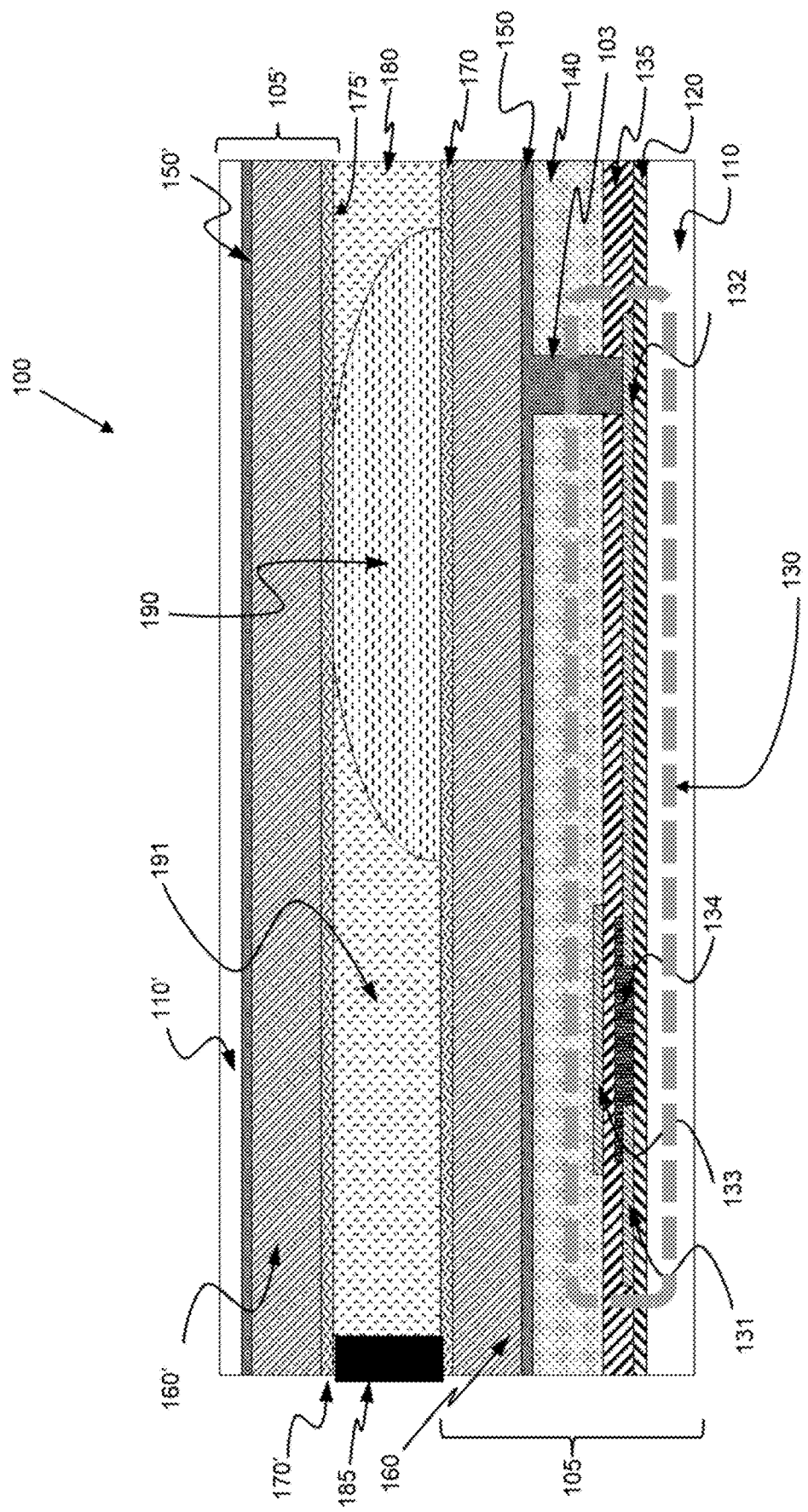
FIG. 1A is a schematic cross-sectional view of a fluidic droplet pixel employing pixel dielectric layers and separate hydrophobic layers, according to one embodiment of the disclosure.

The disclosure relates generally to EWOD devices having a fluidic droplet pixel formed substantially from organic materials as described herein. For example, in various embodiments, the disclosure provides an active matrix array of pixels on a glass or plastic substrate comprising organic thin-film transistor structures coupled to electrodes capable of moving a liquid from a pixel, or several pixels, to adjacent one, or ones, by using a voltage bias supplied on the electrodes so that the liquid can be moved from one section of the array to another section.

In various embodiments, the active matrix array of pixels is in contact with one or more liquid reservoirs suppling one or mores liquids, which may be of the same type or of different types. Typically, an aqueous liquid and a aqueous-immiscible organic liquid are used together in EWOD devices.

For efficient liquid movement with low power consumption, it is desirable that only a low voltage bias applied to the pixel electrodes is necessary for fluid motion. Thus, in various desirable embodiments as otherwise described herein, for operation of the pixel electrode at low voltage, high-dielectric constant (high-k) pixel dielectric can be employed so that the corresponding capacitance values are large.

Furthermore, it is desirable that the driving transistors can also operate at low voltages so that the overall device can be easily integrated with the same driving scheme. In various desirable embodiments as otherwise described herein, for operation of the transistor at low voltage, a high-k gate dielectric can be employed so that the corresponding gate dielectric capacitance value is large.

It is known in the art that a dielectric material having a k value greater than that of silicon oxide (SiOx), ~3.9, is considered high-k, with the most common high-k material being silicon nitride (SiNx), which has a k~7.5. In conventional FAB lines producing active matrix TFT backplanes this material is deposited by chemical vapor deposition using highly water-sensitive and toxic silane precursors. Accordingly, in certain desirable embodiments as otherwise described herein, each dielectric layer is a high-k layer, i.e., having a k greater than about 3.9, e.g., at least 4, at least 5, or at least 6. Various polymeric dielectric materials suitable for use in the structures of the disclosure are described herein.

To reduce cost of producing the active-matrix transistors and the pixel electrodes, it is desirable that the majority, possibly the totality, of the device components are fabricated by liquid-processing methodologies such as spin-coating or slot-die coating. Additive manufacturing processes, such as solution printing, are even more inexpensive. In various desirable embodiments, all dielectric layers are fabricated using such liquid-phase methodologies Furthermore, to further reduce cost it is desirable that at least some of the layers used in the device fabrication are mostly composed of a material having the same chemical structure or originating from the same chemical precursor. For instance, the pixel dielectric layers and the gate dielectric layer could be deposited from formulations where the major component has the same chemical structure. Similarly, the buffer layer and the planarization layer (when either or both are present) could be deposited from formulations having the major component with the same chemical structure. Preferentially, all passive and dielectric layers could be produced from similar or identical formulations. The source, drain, and gate electrical contact could be made with the same metal as well as the pixel contacts could be made with the same metal or transparent conducting oxide.

One of the issues in fabricating active-matrix arrays using amorphous silicon (a-Si)-based transistors is that the processing temperature for such tranistors usually is at least about 250° C. Moreover, active-matrix arrays using indium-gallium-zinc oxide (IGZO)-based transistors also require post-deposition annealing at temperatures of at least about 350° C. Other active matrix TFT technologies requires even higher processing temperatures. On the other hand, active-matrix array based on OTFTs can be processed at temperatures no greater than about 150° C. Thus, unlike the case for these inorganic-based transistor technologies, inexpensive plastic substrates can be used for the fabrication of OTFT-driven devices.

One aspect of the disclosure is an electrowetting on dielectric (EWOD) device in which droplet motion can be controlled by an active-matrix array based on organic thin-film transistors (OTFTs).

In various embodiments, the organic thin-film transistors used in devices of this disclosure comprise a semiconductor material and a gate dielectric material that are liquid-processable and deposited as layer films. Furthermore, three electrical contacts, or electrodes, are present to apply biases for operating the organic thin-film transistor.

One aspect of the disclosure provides a fluidic droplet pixel, the fluidic droplet pixel comprising:

a first platform comprising a first substrate, a first pixel electrode disposed on the first substrate, and a first pixel dielectric layer disposed on the first substrate, the first pixel electrode being disposed between the first substrate and the first pixel dielectric layer, the first platform presenting a first hydrophobic surface opposite the first substrate, the first platform further comprising an organic thin film transistor (OTFT) comprising source and drain electrodes separated by an organic semiconductor channel, and a gate electrode separated by the source and drain electrodes by a gate dielectric layer, said organic thin film transistor being disposed outside said fluidic channel between the first substrate and the first hydrophobic surface; and a second platform comprising a second substrate, a second pixel electrode disposed on the second substrate, and a second pixel dielectric layer disposed on the second substrate, the second pixel electrode being disposed between the second substrate and the second pixel dielectric layer, the second platform presenting a second hydrophobic surface opposite the second substrate;

the first hydrophobic surface and the second hydrophobic surface defining boundaries of a fluidic channel between the first platform and the second platform; and wherein each of the gate dielectric layer, the first pixel dielectric layer, and the second pixel dielectric layer comprise an organic polymer.

An EWOD pixel of the disclosure comprises an organic thin-film transistor and a microfluidic channel. An embodiment of a fluidic droplet pixel 100 suitable for use in an active-matrix array is shown in the schematic cross-sectional view in FIG. 1A.

Without reference or limitation to a specific production method, first platform 105 and a second platform 105' are provided. The first platform 105 includes a first substrate 110 to provide an desirable support on which an organic thin film transistor (OTFT) 130 (indicated by the dashed line) is disposed. In the embodiment of FIG. 1A, a buffer dielectric layer 120 is disposed on the first substrate 110 between the OTFT 130 and the first substrate 110. As the person of ordinary skill will appreciate, the buffer layer can ensure electrical isolation of the OTFT from the first substrate; however, a buffer layer is often not necessary.

The first platform also includes a first pixel electrode 150 and a first pixel dielectric layer 160, both disposed on the first substrate 110, the first pixel electrode being disposed between the first substrate and the first pixel dielectric layer. The first platform presents a first hydrophobic surface 175. In the embodiment of FIG. 1A, the hydrophobic surface 175 is provided by a hydrophobic layer 170 formed on the first pixel dielectric layer 160.

The second platform 105' includes a second substrate 110', as well as a second pixel electrode 150' and a second pixel dielectric layer 160', both disposed on the second substrate 110', the second pixel electrode being disposed between the second substrate and the second pixel dielectric layer.

In the embodiment of FIG. 1A, it is the hydrophobic layers 170 and 170' that provide the hydrophobic surfaces. Here, the first pixel dielectric layer 160 is disposed between the first pixel electrode 150 and the first hydrophobic layer 170, and the second pixel dielectric layer 160' is disposed between second pixel electrode 150' and second hydrophobic layer 170'.

The OTFT 130 is disposed between the first substrate 110 and the first hydrophobic surface 175, and is configured to provide a switchable voltage bias between the first pixel electrode and the second pixel electrode. In the embodiment of FIG. 1A, the OTFT 130 is disposed between the first pixel dielectric layer 160 and the first substrate 110. OTFT 130 includes a source electrode 131, a drain electrode 132 and a gate electrode 133. An organic semiconductor channel 134 separates the source electrode 131 from the drain electrode 132. An gate dielectric layer 135 separates the gate electrode 133 from the source electrode 131 and the drain electrode 132. In the embodiment of FIG. 1A, the drain electrode of the OTFT is in electrical contact with the first pixel electrode. A downward contacting element 103, also referred in the art as a "hole," puts the first pixel electrode 150 in electrical contact with the OTFT drain electrode 132.

In various desirable embodiments, a planarization layer separates the OTFT from the first pixel electrode (i.e., other than contact necessary for the OTFT to be able to provide a bias between first and second electrodes). In the embodiment of FIG. 1A, a planarization layer 140 separates the OTFT 130 from the first pixel electrode 150, but for the hole 103. Thus, the gate electrode 133 is separated from the first pixel electrode 150 by the planarization layer 140.

The first hydrophobic surface of the first platform and the second hydrophobic surface of the second platform define boundaries of a fluidic channel between the first platform and the second platform. In the embodiment of FIG. 1A, fluidic channel 180 is defined by first hydrophobic layer 170 and second hydrophobic later 170'. Here, a spacer 185 ensures the separation of first and second hydrophobic layers 170, 170'. It is to be understood that the spacer 185 width is much narrower than the channel 180 width and therefore it does not prevent droplet movements or limit significantly the active pixel area, as better appreciated in FIG. 1B.

FIG. 1B illustrates the topography scheme of an example of a 2×2 EWOD pixel array that employs four pixels 100, showing the OTFT 130, pixel electrode 150, spacer 185 and via hole 103 which allows the drain electrode 132 of OTFT 130 to be electrically connected to the first pixel electrode 150. A scan line 101 and a data line 102 can be used to address the individual pixels. As the person of ordinary skill in the art will appreciate, such arrayed devices can be provided as multiple pixels fabricated on a common substrate. Continuous layers can, where appropriate, be used to provide various pixel layers. For example, in various embodiments, continuous layers can be used to provide various dielectric layers and the second pixel electrode of each pixel in such an array.

Such devices can be made using methods typical in the art of thin layer film-based devices. For example, the first substrate 110 can be provided with all of the structures up to and including the first hydrophobic layer 170 by sequential deposition and patterning. Similarly, the second substrate 110' can be provided with all of the structures up to and including the second hydrophobic layer 170' by sequential deposition and patterning. Thus provided, the second substrate 110' can be inverted and aligned with first substrate 110 and a gap can be created and maintained by a spacer 185 between the substrates, thus defining the fluidic channel 180. Immiscible fluid 191 (e.g., an aqueous-immiscible fluid such as an oil) may be injected within the gap to promote the motion of microfluid droplet 190 (e.g., an aqueous fluid).

In various embodiments as otherwise described herein, the first platform further includes a buffer dielectric layer disposed on the first substrate between the OTFT and the substrate. This buffer dielectric layer can be formed of a dielectric polymer. For example, in the embodiment of FIG. 1A, buffer dielectric layer 120 is disposed on the first substrate 110, between the OTFT 130 and the first substrate 110. Buffer dielectric layers are commonly used in thin film transistor devices to ensure electrical isolation from the substrate.

In one embodiment of a pixel according to the disclosure and as generally described with reference to pixel 100 of FIG. 1A, the gate dielectric layer 135, the planarization layer 140 (when present) and the buffer dielectric layer 120 (when present) can be deposited from formulations having the same organic polymer as the major component. More preferably, the buffer layer 120, the gate dielectric layer 135, and the planarization layer 140 are made of the same material.

It is also to be remarked that although various preferred embodiments use the same formulation to deposit the first and second pixel dielectric layers 160, 160', these could be in principle (albeit less preferably) realized with different formulations.

In another embodiment of a pixel of the disclosure, generally provided as described with respect to pixel 100 of FIG. 1A, the gate dielectric 135 and the first and second pixel dielectric layers 160, 160' are deposited from formulations having the same organic polymer as the major component. More preferably, the gate dielectric 135 and the first and second pixel dielectric layers 160, 160' are made of the same material.

Figure 2A:
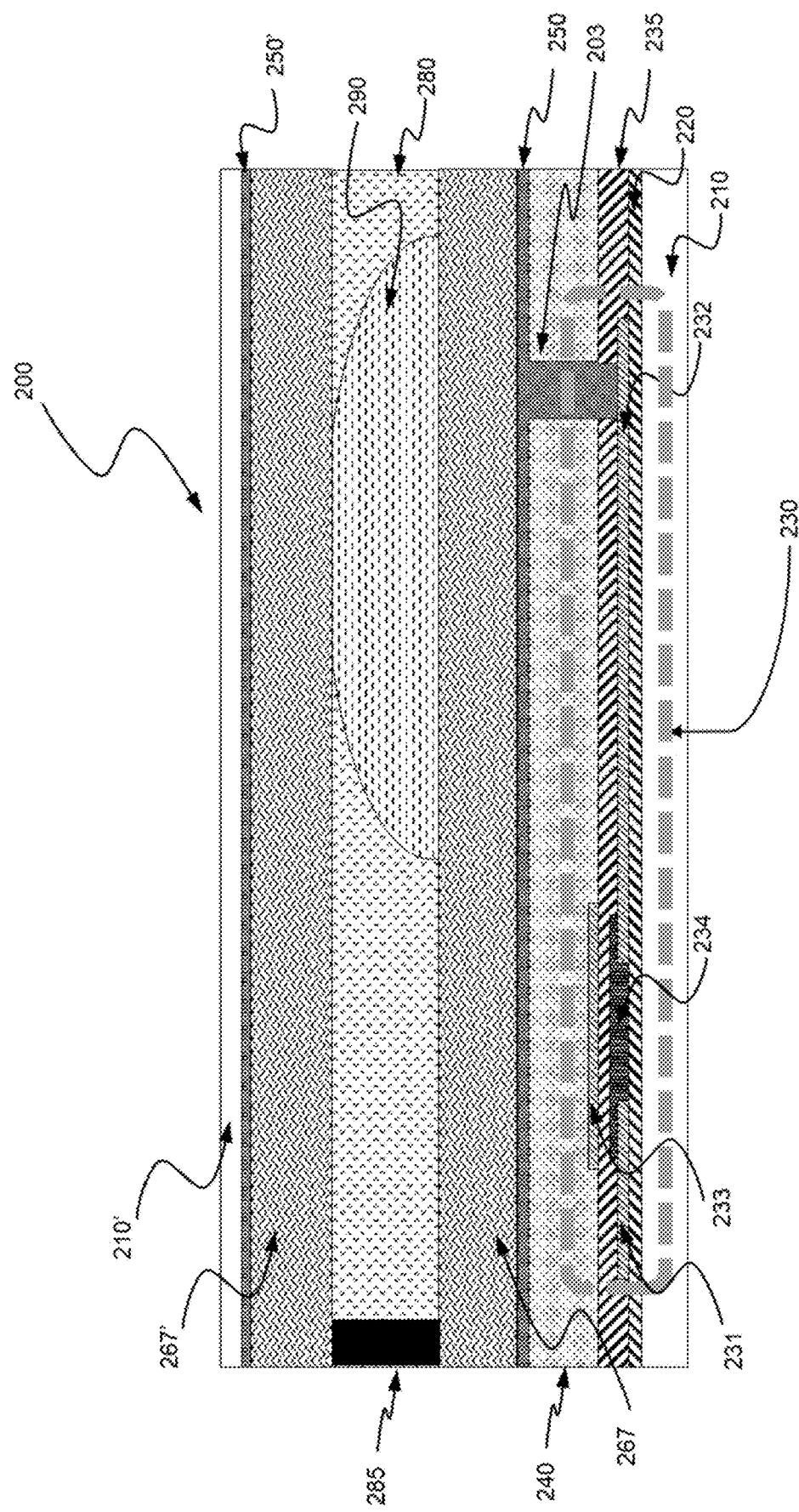
FIG. 2A is a schematic cross-sectional view of a fluidic droplet pixel employing pixel dielectric layers that are themselves hydrophobic, according to another embodiment of the disclosure.

FIG. 2A provides a schematic cross-sectional view of another EWOD pixel 200 according to the present disclosure. In this case, the pixel dielectric layers have properties promoting the electrowetting motion of the microfluidic droplet without the need of a separate hydrophobic layer coating. Thus, in this structure, layers 267 and 267' in contact with first and second pixel electrodes 250, 250' are at the same time hydrophobic and pixel dielectric and define, together with spacer 285, fluidic channel 280.

Figure 2B:
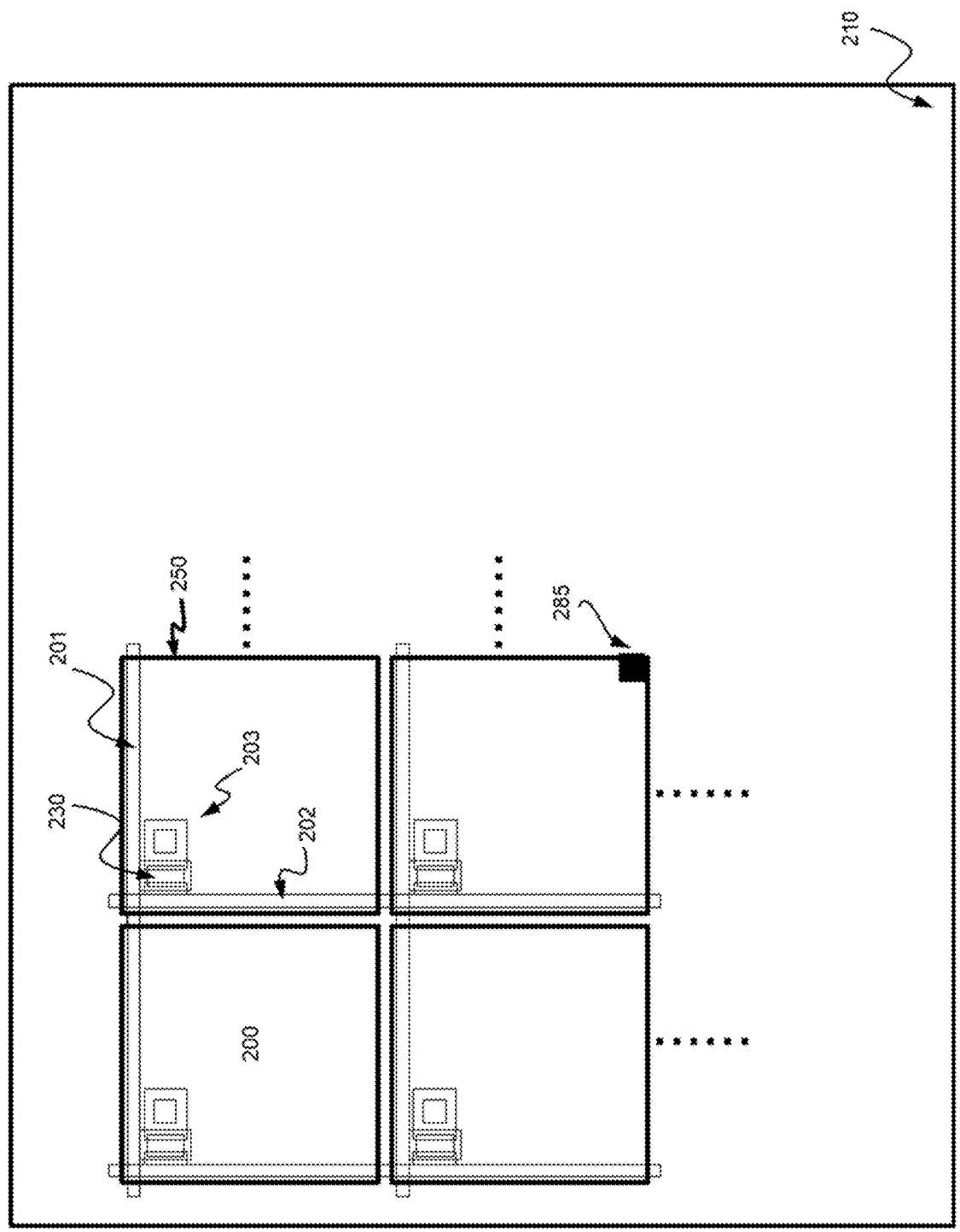
FIG. 2B is a schematic plan view of active matrix fluidic droplet driver system having a 2×2 array of pixels each as schematically exemplified in FIG. 2A.

FIG. 2B provides a schematic view of a 2×2 EWOD pixel array employing four pixels 200, showing the OTFT 230, pixel electrode 250, spacer 285 and via hole 203 which allows the drain electrode 232 of OTFT 230 to be electrically connected to the first pixel electrode 250. A scan line 201 and a data line 202 can be used to address the individual pixels.

Without being bound to any particular theory, the pixel dielectric material can function as both pixel dielectric layer and hydrophobic layer by using formulations with certain polymers, certain chemical additives or post-layer deposition chemical or physical treatments (e.g., described by Fabbri et al. Modification of Polymer Properties 2017, Pages 109-130, which is hereby incorporated herein by reference).

A first simplified alternate embodiment of pixel 200 schematic of FIG. 2A envisions the buffer layer 220, the gate dielectric layer 235, and the planarization layer 240 being deposited from formulations having the same organic polymer as the major component. More preferably, the buffer layer 220, the gate dielectric layer 235, and the planarization layer 240 are made of the same material.

Another embodiment of pixel 200 schematic of FIG. 2A envisions the gate dielectric layer 235 and first and second pixel dielectric layers 267, 267' being deposited from formulations having the same organic polymer as the major component. More preferably, the gate dielectric layer 235 and first and second pixel dielectric layers 267, 267' are made of the same material.

The first substrate 210, the second substrate 210', the microfluid droplet 290, the source electrode 231, the gate electrode 233, and the organic semiconductor layer 234 can be generally as described for analogous elements with respect to FIG. 1A.

Figure 3A:
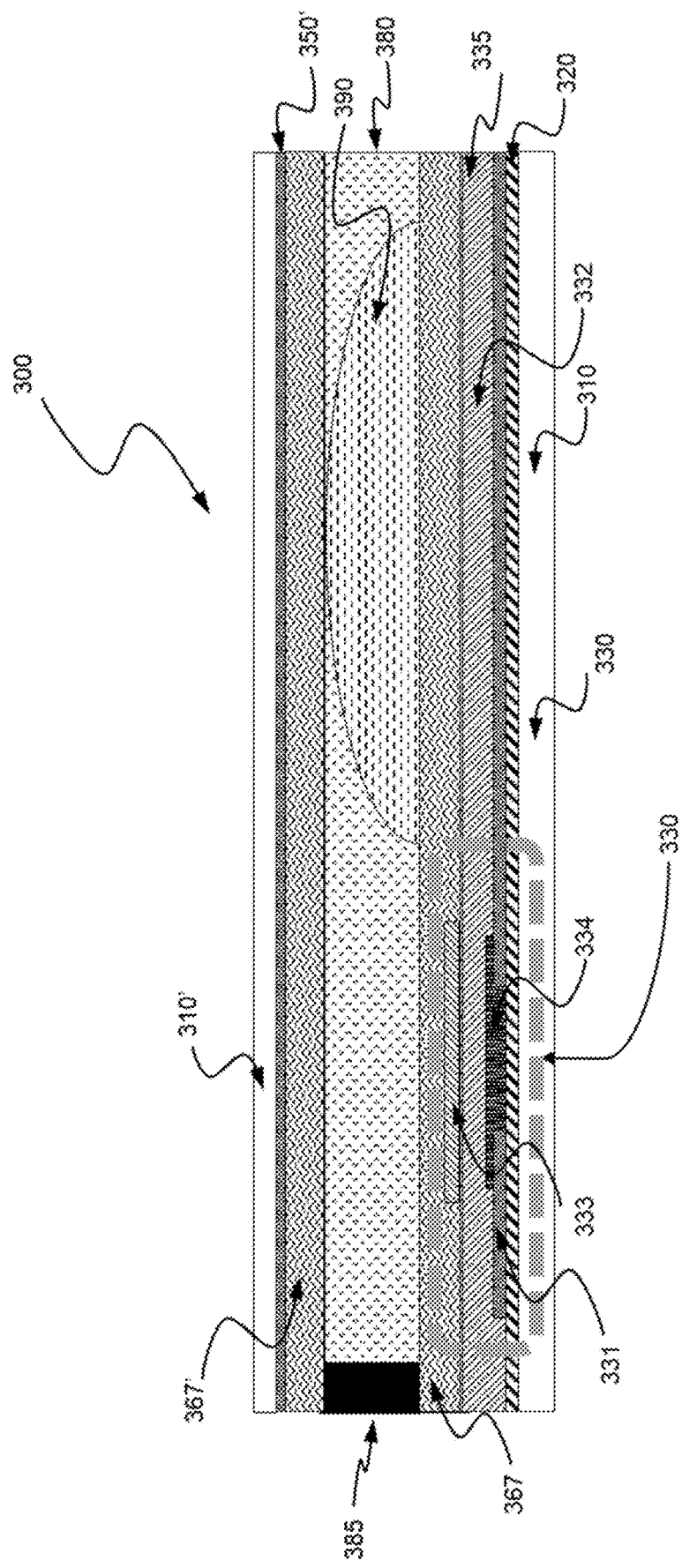
FIG. 3A is a schematic cross-sectional view of a fluidic droplet pixel employing a common dielectric layer as the pixel dielectric layer and the gate dielectric layer, the dielectric itself being hydrophobic, according to another embodiment of the disclosure.

A schematic cross-sectional view of an especially preferred embodiment for a fluidic pixel driver according to the present invention is shown in FIG. 3A. Similar to the devices of FIGS. 1A and 2A, first and second platforms 305 and 305' define the boundaries of the fluidic pixel driver 300. In detail, on top of the first substrate 310 is present a buffer layer 320, on top of which is present an OTFT structure 330, comprising a source electrode 331, a drain electrode 332 separated from the source electrode by a semiconductor channel/layer 334. A gate electrode 333 is separated from source electrode 331, drain electrode 332, and semiconductor channel 334 by a gate dielectric layer 335. In contrast to the embodiments of FIGS. 1A and 2A, a separate first pixel electrode 350 is not provided in electrical contact with the OTFT drain electrode 332. Rather, the OTFT drain electrode 332 fulfills the function of a first pixel electrode, advantageously leading to a leaner structure that is easier to manufacture. In the embodiment of FIG. 3A, there is a single high-k pixel dielectric layer 367 on top of the dielectric layer 333; it is hydrophobic and so provides a hydrophobic contact layer for the droplet 390. Similarly, the other face of the fluidic pixel 300 is formed of a second plastic substrate 310' that has disposed thereon a second pixel electrode 350' and a hydrophobic pixel dielectric layer 367'. The separation between first fluidic pixel dielectric layer 367 and second pixel dielectric layer 367' is provided by a spacer 385, thereby defining the fluidic channel 380 in which the separated by spacer 385.

Figure 3B:
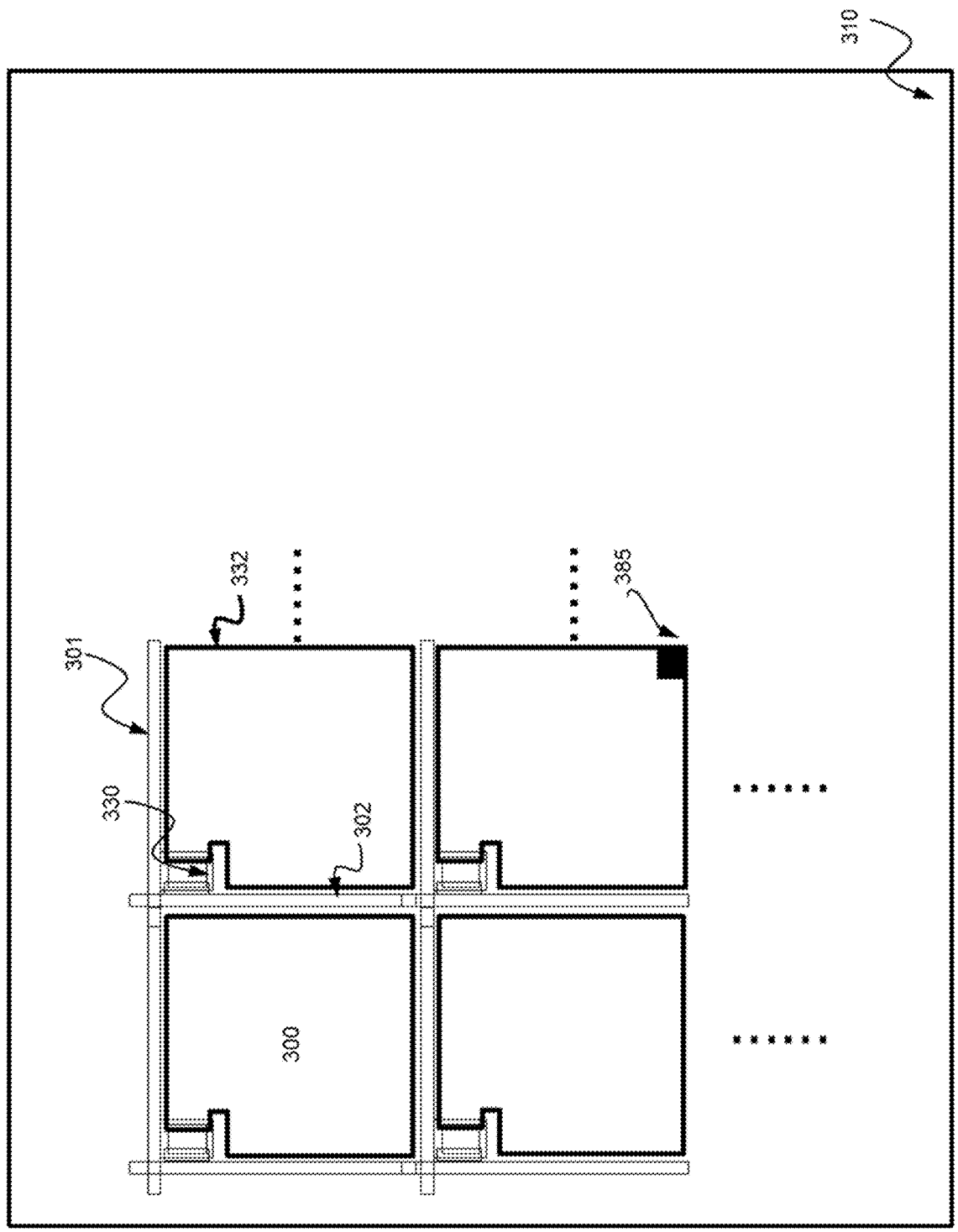
FIG. 3B is a schematic plan view of active matrix fluidic droplet driver system having a 2×2 array of pixels each as schematically exemplified in FIG. 3A.

FIG. 3B is a schematic view of a 2×2 EWOD pixel array employing four pixels 300, comprising a common dielectric for EWOD and OTFT architectures, with electrode 332 acting as a common pixel and OTFT drain electrode. Here, too, a scan line 301 and a data line 302 can be used to address the individual pixels.

It will be seen by the Examples that to operate properly the pixel structure 300 requires that both the gate dielectric and the pixel dielectric are desirably high-k. Accordingly, in various embodiments, each of the gate dielectric layer, the first pixel dielectric layer and second dielectric layer have dielectric constants of at least 3.9, e.g., at least 4, or at least 5.

In various embodiments as otherwise disclosed herein, the dielectric constant k of the gate dielectric is about 3-4 and that of the pixel dielectric is about 8-15, In other embodiments. the k of the gate dielectric is about 7-12 and that of the pixel dielectric is about 10-25. In preferred embodiments the k of the gate dielectric and the pixel dielectric are the same and about 10.

As used herein, "liquid-processable" or "liquid-processed" refers to the ability of a material, for example, the present compounds, to be processed via various liquid-phase processes (i.e., in which the material is dissolved or dispersed in a liquid).

As used herein, a "p-type semiconductor material" or a "p-type semiconductor" refers to a semiconductor material having holes as the majority current carriers. As used herein, an "n-type semiconductor material" or an "n-type semiconductor" refers to a semiconductor material having electrons as the majority current carriers.

As used herein a dielectric material refers to a material capable of blocking electronic charge when a bias voltage is applied across a dielectric film using two electrical contacts.

Organic thin-film transistors used in various devices of the disclosure invention are not limited to any specific p-type or n-type semiconductor materials as long as they can be processed from liquid. Exemplary p-type semiconductors include soluble pentacenes (e.g., those described in U.S. Pat. No. 7,125,989); oligothiophenes and polythiophenes (e.g., dihexyl quarterthiophene, DH4T, and regioregular poly(3-hexylthiophene, rr-P3HT); anthracenes such as 2-(4-hexylphenylvinyl) anthracene (see Dadvand et al., "Maximizing Field-Effect Mobility and Solid-State Luminescence in Organic Semiconductors," Angew. Chem. Int. Ed., 51:3837-3841 (2012)); thienocoronene-based compounds (e.g., those described in International Publication No. WO2012/030662); alkylated [1]benzothieno[3,2-b]benzothiophenes (BTBTs) and alkylated dinaphtho[2,3-b:2',3'-f]thieno[3,2-b]thiophenes (DNTTs) (see e.g., Ebata, H. et al., "Highly Soluble [1]Benzothieno[3,2-b]benzothiophenes (BTBT) Derivatives for High-Performance, Solution-Processed Organic Field-Effect Transistors," JACS, 129 (51): 15732-15733 (2007); and Ebata, H. et al., "Alkylated Dinaphtho [2,3-b: 2',3'-f]Thieno[3,2-b]Thiophenes ($C_n$-DNTTs): Organic Semiconductors for High-Performance Thin-Film Transistors," Adv. Mat., 23 (10): 1222-1225 (2011)); other thieno-fused compounds such as dibenzo[d, d']thieno[3,2-b;4,5-b']dithiophenes, naphtha[2,1-b: 6,5-b']difurans, and fluorinated anthradithiophene derivatives (see Miyata et al., "High-performance organic field-effect transistors based on dihexyl-substituted dibenzo[d,d']thieno[3,2-b;4,5-b']dithiophene," J. Mater. Chem. (2012); Mitsui et al., "Naphtha[2,1-b:6,5-b']difurans: A Versatile Motif Available for Solution-Processed Single-Crystal Organic Field-Effect Transistors with High Hole Mobility," J. Am. Chem. Soc, 134:5448-5451 (2012); and Subramanian et al., "Chromophore Fluorination Enhances Crystallization and Stability of Soluble Anthradithiophene Semiconductors," J. Am. Chem. Soc., 130 (9): 2706-2707 (2008)); and phthalimide-based, diketopyrrolopyrrole-based, and isoindigo-based conjugated polymers (see International Publication No. WO2010/117449; Li et al., "A High Mobility P-Type DPP-Thieno[3,2-b]thiophene Copolymer for Organic Thin-Film Transistors," Adv. Mater., 22:4862-4866 (2010); Li et al., "Annealing-Free High-Mobility Diketopyrrolopyrrole-Quaterthiophene Copolymer for Solution-Processed Organic Thin Film Transistors," J. Am. Chem. Soc., 133:2198-2204 (2011); Bronstein et al., "Thieno[3,2-b]thiophene-Diketopyrrolopyrrole-Containing Polymers for High-Performance Organic Field-Effect Transistors and Organic Photovoltaic Devices," *J. Am. Chem. Soc.*, 133:3272-3275 (2011); Chen et al., "Highly pi-Extended Copolymers with Diketopyrrolopyrrole Moieties for High-Performance Field-Effect Transistors," *Adv. Mater.* (2012); Mei et al., "Siloxane-Terminated Solubilizing Side Chains: Bringing Conjugated Polymer Backbones Closer and Boosting Hole Mobilities in Thin-Film Transistors," *J. Am. Chem. Soc.*, 133:20130-20133 (2011); and Lei et al., "High-Performance Air-Stable Organic Field-Effect Transistors: Isoindigo-Based Conjugated Polymers," *J. Am. Chem. Soc.*, 133:6099-6101 (2011)). Additional examples of p-type semiconductors include linear acenes, bent acenes, arylvinylenes, phenylenes, and fused (hetero) arenes substituted with alkyl and/or alkoxy groups.

Examples of soluble n-type semiconductors include fused ring tetracarboxylic diimides and their derivatives (e.g., cyanated perylene diimides (PDIs) or naphthalene diimides (NDIs) such as those described in U.S. Pat. No. 7,671,202); hybrid PDIs/NDIs, pi-bridge linked dimeric NDIs, and large disc-like ovalene diimides (see e.g., Yue et al., "Hybrid Rylene Arrays via Combination of Stille Coupling and C-H Transformation as High-Performance Electron Transport Materials," J. Am. Chem. Soc. (2012); Hwang et al., "Stable Solution-Processed Molecular n-Channel Organic Field-Effect Transistors," Adv. Mater. (2012); Polander et al., "Solution-Processed Molecular Bis (Naphthalene Diimide) Derivatives with High Electron Mobility," Chem. Mater., 23:3408-3410 (2011); and Li et al., "Disc-like 7,14-dicyano-ovalene-3,4:10,11-bis(dicarboximide) as a solution-processible n-type semiconductor for air stable field-effect transistors," Chem. Sci., 3:846-850 (2012)); NDIs fused with 2-(1,3-dithiol-2-ylidene) malonitrile groups (see e.g., Gao et al., "Core-Expanded Naphthalene Diimides Fused with 2-(1, 3-Ditiol-2-Ylidene) Malonitrile Groups for High-Performance Ambient-Stable, Solution-Processed n-Channel Organic Thin Film Transistors," J. Am. Chem. Soc., 132 (11): 3697-3699 (2010)); dicyanomethylene-substituted conjugated systems (e.g., those described in U.S. Pat. No. 7,928,249 and Qiao et al., "Diketopyrrolopyrrole-Containing Quinoidal Small Molecules for High-Performance, Air-Stable, and Solution-Processable n-Channel Organic Field-Effect Transistors," J. Am. Chem. Soc., 134:4084-4087 (2012)); thionated aromatic bisimides (e.g., those described in International Publication No. WO2011/082234); NDI-containing polymers (e.g., those described in U.S. Patent Application Publication No. US 2010/0326527); and thiophene-imide polymers (e.g., those described in International Publication No. WO2012/156948). Additional examples of n-type semiconductors include linear acenes, bent acenes, arylvinylenes, phenylenes, and fused (hetero) arenes substituted with alkylcarbonyl, arylcarbonyl, and/or cyano groups.

In various preferred embodiments, the n-type semiconductors comprise one or more compounds selected from N,N'-bis[1-methylpropyl]-1,7-dicyanoperylene-3,4:9,10-bis(dicarboximide) (1a), N,N'-bis[1-methylpropyl]-1,6-dicyanoperylene-3,4:9,10-bis(dicarboximide) (1b), N,N'-bis[1-methylbutyl]-1,7-dicyanoperylene-3,4:9,10-bis(dicarboximide) (2a), N,N'-bis[1-methylbutyl]-1,6-dicyanoperylene-3,4:9,10-bis(dicarboximide) (2b), N,N'-bis[1-methylpentyl]-1,7-dicyanoperylene-3,4:9,10-bis(dicarboximide) (3a), and N,N'-bis[1-methylpentyl]-1,6-dicyanoperylene-3,4:9,10-bis(dicarboximide) (3b):

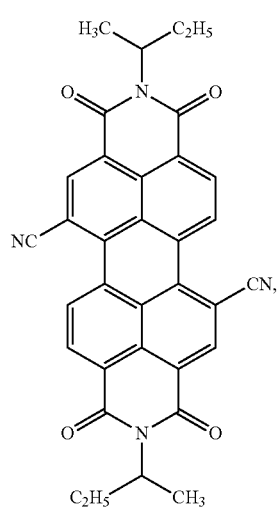

1a

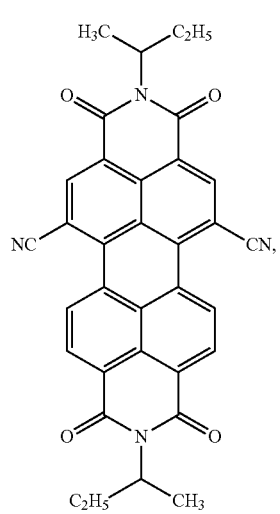

1b

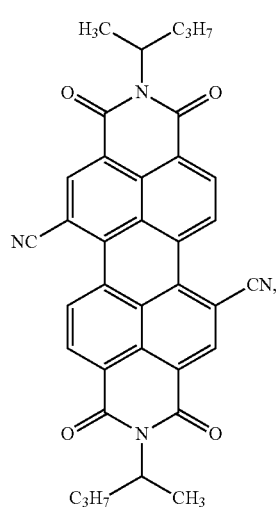

2a

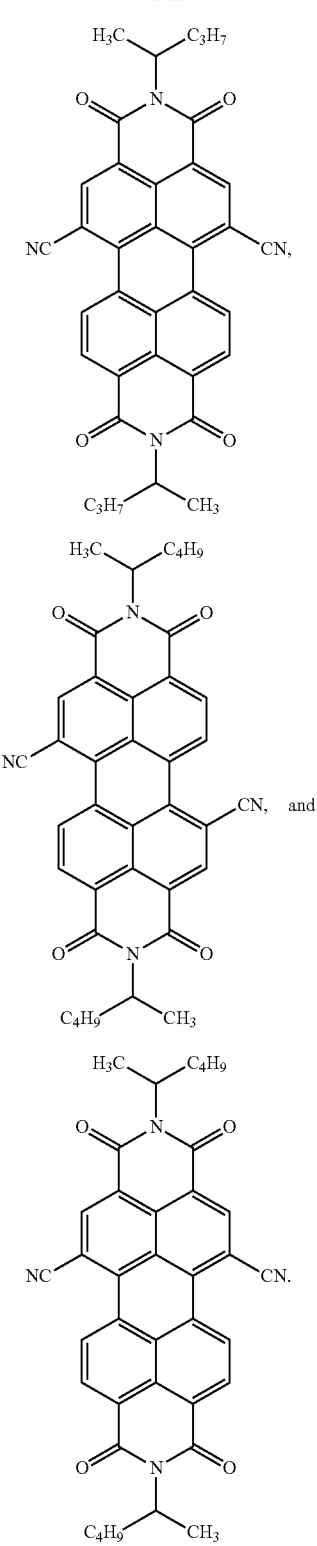

Various synthetic methods for compounds of this type, and various details for their use, including solution processing to form thin film semiconductor devices, are described in U.S. Pat. Nos. 7,671,202, 7,902,363, 8,404,844 and 9,147,850, each of which is hereby incorporated herein by reference in its entirety.

As noted above, a thin-film transistor as otherwise described herein comprises a gate dielectric layer. In various embodiments, the gate dielectric layer has a dielectric constant that is at least 2.5, or even at least 4. In various embodiments as otherwise described herein, the gate dielectric layer has a dielectric constant in the range of 2.5-12, for example, in the range of 2.5-5, 2.5-7, or 4-10, or 6-12.

The thickness (d) of the gate dielectric layer defines another important property of a dielectric film, which is the areal capacitance, $C_i$, given by the equation $C_i = k \, \varepsilon_o/d$, where $\varepsilon_o$ is the vacuum permittivity. In various embodiments as otherwise described herein, d is in the range of 200-2000 nm, preferably 400-1000 nm, more preferably 500-800 nm. In other embodiments, d is in the range of 200-1000 nm, or 200-800 nm, or 400-2000 nm, or 400-800 nm, or 500-2000 nm, or 500-1000 nm. In various embodiments, the area capacitance of the gate dielectric layer is within the range of 1 $nF/cm^2$ to 50 $nF/cm^2$.

In various embodiments as otherwise described herein, the OTFT gate dielectric layer comprises one or more polymeric OTFT gate dielectric materials (e.g., as a mixture, or as two or more sublayers). As used herein, the term "dielectric material" refers to materials having a conductivity on the order of $10^{-6}$ S·cm$^{-1}$ or less. In various such embodiments, a gate dielectric layer including a dielectric polymer layer and an inorganic dielectric material layer further includes an interlayer (i.e., to improve layer compatibility). In various embodiments as otherwise described herein, the gate dielectric layer includes one or more dielectric polymers selected from fluorinated para-xylene, fluoropolyarylether, fluorinated polyimide, polystyrene, poly(α-methyl styrene), poly(α-vinylnaphthalene), poly (vinyltoluene), polyethylene, cis-polybutadiene, polypropylene, polyisoprene, poly(4-methyl-1-pentene), poly(tetrafluorethylene), poly(chlorotrifluoroethylene), poly (2-methyl-1,3-butadiene), poly(p-xylylene), poly(α-α-α'-α'-tetrafluoro-p-xylylene), poly[1,1-(2-methyl propane) bis (4-phenyl) carbonate], poly(cyclohexyl methacrylate), poly (4-chlorostyrene), poly(2,6-dichlorostyrene), poly(4-bromostyrene), poly(2,6-dimethyl-1,4-phenylene ether), polyisobutylene, poly(vinyl cyclohexane), poly(arylene ether), polyphenylene, poly(ethylene/tetrafluoroethyelene), poly(ethylene/chlorotrifluoroethylene), fluorinated ethylene/propylene copolymer, polystyrene-co-α-methyl styrene, ethylene/ethyl acetate copolymer, poly(styrene/butadiene), poly(styrene/2,4-dimethylstyrene), polypropylene-co-1-butene, poly(methyl methacrylate), poly(ethyl methacrylate), poly(2-hydroxyethyl methacrylate), poly(butyl methacrylate), poly(hexyl methacrylate), poly(benzyl methacrylate), poly(vinyl phenol), poly(vinyl alcohol), poly (vinyl alcohol-co-ethylene), poly(isobutylene/methyl methacrylate), poly(vinyl phenol/methyl methacrylate), poly(vinyl chloride), polysaccharides such as 2-hydroxyethyl cellulose, cellulose actate, cellullose acetate butyrate, ethyl cellulose; cyanated (ethoxylated) polysaccharides such as cyanopullulan (e.g., CYMM®), benzocyclobutene-based polymers, poly(2-vinylpyridine), poly(4-vinylpyridine), poly(4-vinylpyridine-co-butyl methacrylate), poly(4-vinylpyridine-co-styrene), poly(l-vinylpyrrolidone-co-styrene), poly(l-vinylpyrrolidone-co-vinyl acetate), poly(vinylidine fluoride), polyacrylonitrile, poly(acrylonitrile-co-butadiene-co-styrene), poly(acrylonitrile-co-methyl acrylate), polyacrylamide, poly(N-isopropylacrylamide), poly(2-ethyl-2-oxazoline), polyvinylpyrrolidone, poly(pentafluorostyrene), poly(dimethylsiloxane), poly(tetrahydrofuran), poly(methyl vinyl ether), poly(methyl vinyl ether-alt-maleic anhydride), poly(ethyl vinyl ether), poly (ethylene-alt-maleic anhydride), poly(allylamine), poly(ethyleneimine), poly(vinyl acetate), poly(vinyl cinnamate), poly(vinyl stearate), poly(vinyl propionate), poly(vinyl formate), poly(ethylene glycol), poly(propylene glycol), poly(styrene-co-acrylonitrile), poly(maleic anhydride-alt-1-octadecane), poly(tetrahydrofuryl methacrylate), poly(Bisphenol A carbonate), poly(propylene carbonate), poly(1,4-butylene terephthalate), poly(diallyl isophthalate), poly(hexafluoropropylene oxide), poly(fluoropropylene oxide-co-perfluoroformaldehyde), and perfluoro (1-butenyl vinyl ether) homocyclopolymers (e.g., CYTOP®).

In various preferred embodiments as otherwise described herein, the gate dielectric layer includes one or more crosslinkable dielectric polymers described in U.S. Pat. No. 8,878,169

More preferably, the crosslinkable dielectric polymer is selected from those of formulas 4 and 5.

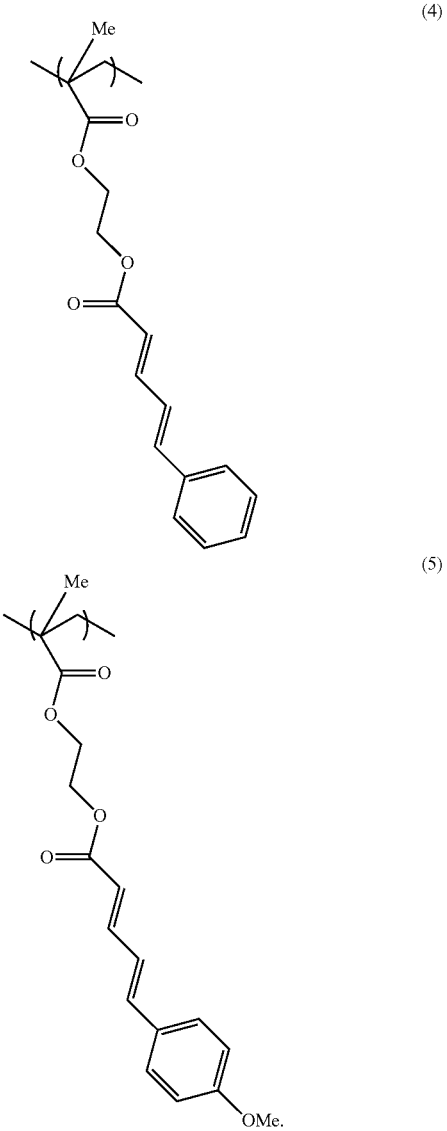

As noted above, in various embodiments the organic thin-film transistor as otherwise described herein includes electrical contacts, specifically, a source electrode, a drain electrode, and a gate electrode. In various embodiments as otherwise described herein, one or more of the source electrode, drain electrode, and gate electrode comprise a metal or metal alloy including copper, aluminum, gold, silver, platinum, palladium, molybdenum, nickel, or any mixture thereof, or an electrically conductive polymer such as polyethylenethioxythiophene (PEDOT). In various embodiments as otherwise described herein, each of the source electrode, drain electrode, and gate electrode independently comprises a gold layer, a silver layer, a copper layer, or a molybdenum layer. In various embodiments as otherwise described herein, one or more of the source electrode, drain electrode, and gate electrode independently comprises a silver layer. In various such embodiments, each of the source electrode, drain electrode, and gate electrode comprises a silver layer. In various such embodiments, one or more of (e.g., each of) the source electrode and drain electrode further comprise a contact-modification layer (e.g., disposed adjacent the semiconductor component, to facilitate charge injection), such as a self-assembled monolayer. In various such embodiments, the gate electrode further comprises a contact-modification layer (e.g., disposed adjacent the gate dielectric layer).

Each of the source electrode, drain electrode, and gate electrode of the thin-film transistor as otherwise described herein independently has a thickness in the direction of the semiconductor component thickness, i.e., in the direction orthogonal to the supporting substrate layer. In various embodiments as otherwise described herein, each of the source electrode, drain electrode, and gate electrode independently has a thickness within the range of 30 nm to 500 nm.

As noted above, the organic thin-film transistor as otherwise described herein can in various embodiments include a buffer layer and a planarization layer. In various embodiments as otherwise described herein, the buffer layer and the planarization layer include one or more dielectric polymers selected from fluorinated para-xylene, fluoropolyarylether, fluorinated polyimide, polystyrene, poly(α-methyl styrene), poly(α-vinylnaphthalene), poly(vinyltoluene), polyethylene, cis-polybutadiene, polypropylene, polyisoprene, poly(4-methyl-1-pentene), poly(tetrafluorethylene), poly(chlorotrifluoroethylene), poly(2-methyl-1,3-butadiene), poly(p-xylylene), poly(α-α-α'-α'-tetrafluoro-p-xylylene), poly[1,1-(2-methyl propane) bis (4-phenyl) carbonate], poly(cyclohexyl methacrylate), poly(4-chlorostyrene), poly(2,6-dichlorostyrene), poly(4-bromostyrene), poly(2,6-dimethyl-1,4-phenylene ether), polyisobutylene, poly(vinyl cyclohexane), poly(arylene ether), polyphenylene, poly(ethylene/tetrafluoroethyelene), poly(ethylene/chlorotrifluoroethylene), fluorinated ethylene/propylene copolymer, polystyrene-co-α-methyl styrene, ethylene/ethyl acetate copolymer, poly(styrene/butadiene), poly(styrene/2,4-dimethylstyrene), polypropylene-co-1-butene, poly(methyl methacrylate), poly(ethyl methacrylate), poly(2-hydroxyethyl methacrylate), poly(butyl methacrylate), poly(hexyl methacrylate), poly(benzyl methacrylate), poly(vinyl phenol), poly(vinyl alcohol), poly(vinyl alcohol-co-ethylene), poly(isobutylene/methyl methacrylate), poly(vinyl phenol/methyl methacrylate), poly(vinyl chloride), polysaccharides such as 2-hydroxyethyl cellulose, cellulose actate, cellullose acetate butyrate, ethyl cellulose; cyanated (ethoxylated) polysaccharides such as cyanopullulan (e.g., CYMM®), benzocyclobutene-based polymers, poly(2-vinylpyridine), poly(4-vinylpyridine), poly(4-vinylpyridine-co-butyl methacrylate), poly(4-vinylpyridine-co-styrene), poly(l-vinylpyrrolidone-co-styrene), poly(l-vinylpyrrolidone-co-vinyl acetate), poly(vinylidine fluoride), polyacrylonitrile, poly(acrylonitrile-co-butadiene-co-styrene), poly(acrylonitrile-co-methyl acrylate), polyacrylamide, poly(N-isopropylacrylamide), poly(2-ethyl-2-oxazoline), polyvinylpyrrolidone, poly(pentafluorostyrene), poly(dimethylsiloxane), poly(tetrahydrofuran), poly(methyl vinyl ether), poly(methyl vinyl ether-alt-maleic anhydride), poly(ethyl vinyl ether), poly(ethylene-alt-maleic anhydride), poly(allylamine), poly(ethyleneimine), poly(vinyl acetate), poly(vinyl cinnamate), poly(vinyl stearate), poly(vinyl propionate), poly(vinyl formate), poly(ethylene glycol), poly(propylene glycol), poly(styrene-co-acrylonitrile), poly(maleic anhydride-alt-1-octadecane), poly(tetrahydrofuryl methacrylate), poly(Bisphenol A carbonate), poly(propylene carbonate), poly(1,4-butylene terephthalate), poly(diallyl isophthalate), poly(hexafluoropropylene oxide), poly(fluoropropylene oxide-co-perfluoroformaldehyde), and perfluoro (1-butenyl vinyl ether) homocyclopolymers (e.g., CYTOP®).

In various preferred embodiments as otherwise described herein, the buffer layer and the planarization layer include one or more crosslinkable dielectric polymers described in U.S. Pat. Nos. 7,981,889 and 8,878,169.

In various especially preferred embodiments, the crosslinkable dielectric polymer is selected from those of formulas 4 and 5 (above), and 6.

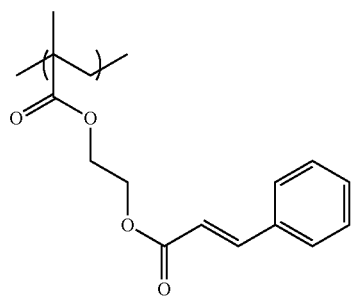

(6)

In various embodiments as otherwise described herein, the active-matrix thin-film transistor driving the pixel array further comprises a substrate supporting the various device components described above. The person of ordinary skill in the art will appreciate that a variety of materials can be used as substrates. In various embodiments as otherwise described herein, the thin-film transistor includes a substrate comprising a glass (e.g., soda lime glass) or a plastic layer. For example, in various such embodiments, the substrate comprises a plastic layer comprising one or more of a polyester (such as polyethylene terephthalate, polyethylene naphthalate, and polycarbonate), polyolefin (such as polypropylene, polyvinyl chloride, and polystyrene), polyphenylene sulfide (such as polyphenylene sulfide), polyamide, aromatic polyamide, polyether ether ketone, polyimide, acrylic resin, and polymethylmethacrylate. In some embodiments, a plastic substrate has a glass transition temperature in the range of 50-250° C. In other embodiments the substrate can be an elastomeric plastic such as SEVS or PDMS. In various embodiments as otherwise described herein, the substrate further comprises a buffer layer or planarization layer (e.g., disposed adjacent the stack of device layers, to improve layer compatibility).

The thin-film transistors described herein can be fabricated by one or more of various deposition processes known to those skilled in the art. Such processes include sputtering, ion-assisted deposition (IAD), physical vapor deposition, printing (e.g., flexo printing, litho printing, gravure printing, ink-jetting, pad printing, etc.), droplet casting, dip coating, doctor blading, roll coating, and spin-coating. For example, a coating formulation comprising an organic n-type semiconductor material as described herein can be deposited onto a substrate between a source electrode and a drain electrode via solution-phase to form the semiconductor component of a top-gate thin-film transistor. For defining the semiconductor layer in the area of the channel of the transistor (where each area where the semiconductor is located is in direct contact with only one source and one drain electrodes, direct patterning or photolithographic patterning can be employed. Direct (or additive) pattering can be carried out using printing methodologies known in the art such as ink-jet printing and gravure printing. For photolithographic patterning, positive or negative photolithographic processes, possibly involving one or multiple development, stripping, and dry etching steps, are carried out after depositing the semiconductor film to the whole substrate area using, for instance, spin-coating or slot-die coating. Both direct and photolithographic processes may require, after semiconductor film deposition by solution processing, to cover the organic semiconductor layer with a thin organic protection layer (10-50 nm), which remains in the transistor channel on top of the semiconductor, after completing the device. Typical protection layers include hydrocarbon polymers, fluorocarbon polymers, and mixture thereof. In various aspects and embodiments, electrical contacts (e.g., the source, drain, and/or gate electrodes) can be formed by processes such as, for example, thermal evaporation, radiofrequency or e-beam sputtering, flexo printing, litho printing, gravure printing, ink-jetting, pad printing, screen printing, droplet casting, dip coating, doctor blading, roll coating, and spin-coating. The person of ordinary skill in the art will select the processes and parameters that provide the desired structure (e.g., configuration, semiconductor component thickness, channel length, etc.).

In various embodiments as otherwise described herein, the pixel dielectric material comprises a partially fluorinated polymer, a photosensitive dehydrohalogenating (e.g., dehydrofluorinating) agent, and a crosslinker. The foregoing components generally do not react chemically with one another without irradiation. However, upon photoexposure, the photosensitive dehydrohalogenating (e.g., dehydrofluorinating) agent causes dehydrohalogenation (e.g., dehydrofluorination) of the polymer and generates double bonds in the polymer backbone. The crosslinker then proceeds to crosslink the polymer by reacting with the newly generated double bonds.

The partially fluorinated polymer can be characterized by a dielectric constant (k) that is greater than about 7, preferably greater than about 15, and more preferably, greater than about 20. The partially fluorinated polymer generally comprises polymerized monomeric units of one or more hydrofluoroolefins. For example, the partially fluorinated polymer can comprise polymerized monomeric units of vinylidene fluoride. In various embodiments, the partially fluorinated polymer can include vinylidene fluoride as a first repeating unit and at least a second repeating unit selected from the group consisting of vinyl fluoride, trifluoroethylene, tetrafluoroethylene, bromotrifluoroethylene, chlorofluoroethylene, chlorotrifluoroethylene, vinylidene chloride, and hexafluoropropylene. In various embodiments, the partially fluorinated polymer further includes a third repeating unit selected from the group consisting of vinyl fluoride, trifluoroethylene, tetrafluoroethylene, bromotrifluoroethylene, chlorofluoroethylene, chlorotrifluoroethylene, vinylidene chloride, and hexafluoropropylene, where the third repeating unit is different from the second repeating unit. In particular embodiments, the partially fluorinated polymer can include vinylidene fluoride as a first repeating unit, a second repeating unit selected from the group consisting of vinyl fluoride, trifluoroethylene, tetrafluoroethylene, and hexafluoropropylene, and an optionally third repeating unit different from the second repeating unit that is selected from the group consisting of vinyl fluoride, trifluoroethylene, tetrafluoroethylene, and hexafluoropropylene, chlorofluoroethylene, chlorotrifluoroethylene, and vinylidene chloride.

For example, the partially fluorinated polymer in an embodiment of the present composition can be a homopolymer of vinylidene fluoride (PVDF). In various embodiments, the partially fluorinated polymer can be a copolymer of vinylidene fluoride and trifluoroethylene (P(VDF-TrFE)), a copolymer of vinylidene fluoride and chlorotrifluoroethylene (P(VDF-CTFE)), or a copolymer of vinylidene fluoride and hexafluoropropylene (P(VDF-HFP)). In other embodiments, the partially fluorinated polymer can be a terpolymer including vinylidene fluoride as a first repeating unit, trifluoroethylene as a second repeating unit, and a third repeating unit selected from the group consisting of vinyl fluoride, tetrafluoroethylene, hexafluoropropylene, chlorofluoroethylene, chlorotrifluoroethylene, and vinylidene chloride. For example, the partially fluorinated polymer can be a terpolymer selected from the group consisting of poly(vinylidene fluoride-trifluoroethylene-chlorotrifluoroethylene), poly(vinylidene fluoride-trifluoroethylene-chlorofluoroethylene), poly(vinylidene fluoride-trifluoroethylene-hexafluoropropylene), poly(vinylidene fluoride-trifluoroethylene-tetrafluoroethylene), poly(vinylidene fluoride-trifluoroethylene-vinyl fluoride), and poly(vinylidene fluoride-trifluoroethylene-vinylidene chloride). The terpolymer can be an alternating terpolymer, where the repeating units are regularly alternating; a periodic terpolymer where the repeating units are arranged in a repeating sequence; a statistical or random terpolymer; or a block terpolymer containing three or more homopolymer subunits linked by covalent bonds. In addition, the terpolymer can be linear or branched.

In some embodiments, the partially fluorinated polymer can be represented by formula (7):

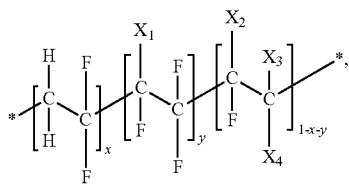

(7)

wherein $X_1$ is selected from the group consisting of H, Cl and $CF_3$;

$X_2$, $X_3$, and $X_4$ are selected from the group consisting of H, F and Cl, provided that no more than one of $X_2$, $X_3$, and $X_4$ is Cl;

x is between about 30 mol % and about 85 mol %, y is between about 10 mol % and about 65 mol %, and x+y≤100 mol %.

The partially fluorinated polymer, the photosensitive dehydrohalogenating agent, and the crosslinker can be mobilized in a liquid medium to provide a composition (a photocrosslinkable composition) for forming a photocrosslinkable material. The composition can be a solution, a dispersion, a suspension, an emulsion, or a gel, although in most embodiments, the composition is a solution or a dispersion suitable for liquid-phase processes. The term "mobilized in a liquid medium" broadly means that the designated liquid medium causes a designated solid to take on properties of a liquid. For example, the solid can be dissolved in the liquid medium to form a single-phase solution, or the solid can be dispersed in the liquid medium to form a two-phase dispersion. In other embodiments, the solid and the liquid medium can be combined together to form an emulsion, a suspension, or a gel. As used herein, the term "solution" means that a substantial proportion of a designated solute has formed a single phase with a designated solvent, but a substantial second phase that can include dispersed particulate matter also can be present.

Various formulation and crosslink methods for compounds of this type, and various details for their use, including solution processing to form thin film semiconductor devices, are provided in U.S. Pat. No. 10,409,159, which is hereby incorporated herein by reference in its entirety.

Accordingly, the present photocrosslinkable composition can be used to deposit thin film materials via various liquid-phase processes known in the art, where the thin film materials can be subsequently photocrosslinked and become insoluble in the mother liquid medium used for film deposition. In various embodiments, the solution-phase process can be selected from spin-coating, slot coating, printing (e.g., inkjet printing, screen printing, pad printing, offset printing, gravure printing, flexographic printing, lithographic printing, mass-printing and the like), spray coating, electrospray coating, droplet casting, dip coating, and blade coating. Spin-coating involves applying an excess amount of the coating solution onto the substrate, then rotating the substrate at high speed to spread the fluid by centrifugal force. The thickness of the resulting film prepared by this technique can be dependent on the spin-coating rate, the concentration of the solution, as well as the solvent used. Printing can be performed, for example, with a rotogravure printing press, a flexoprinting press, pad printing, screen printing or an ink jet printer. The thickness of the resulting film as processed by these printing methods can be dependent on the concentration of the solution, the choice of solvent, and the number of printing repetitions. Ambient conditions such as temperature, pressure, and humidity also can affect the resulting thickness of the film. Depending on the specific printing techniques used, printing quality can be affected by different parameters including, but not limited to, rheological properties of the formulations/compositions such as tension energy and viscosity. For noncontact printing techniques such as inkjet printing, the solubility requirement generally can be less stringent and a solubility range as low as about 1-4 mg/mL can suffice. For gravure printing, a higher solubility range may be necessary, often in the range of about 20-100 mg/mL. Other contact printing techniques such as screen-printing and flexo printing can require even higher solubility ranges, for example, about 100-1000 mg/mL. Generally, the strength of the polymer in the present photocrosslinkable composition can be between about 1 mg/ml and about 200 mg/mL, preferably between about 20 mg/ml and about 100 mg/mL.

In addition to the partially fluorinated polymer, the photosensitive dehydrohalogenating agent, and the crosslinker, the present photocrosslinkable composition also can include one or more additives, processing aids and/or fillers However, in preferred embodiments, the present photocrosslinkable composition can exclude any inorganic (e.g., metal)

fillers. The total solid loading of all the non-polymer components (i.e., the photosensitive dehydrohalogenating agent, the crosslinker, and any optional additives) can be between about 1 mg/ml and about 20 mg/mL, preferably less than about 10 mg/mL.

Materials (e.g., thin film dielectrics) prepared from the present photocrosslinkable composition can be photopatterned directly (without using a photoresist). Accordingly, a patterned dielectric component can be formed by depositing a photocrosslinkable composition according to the present teachings to provide an uncrosslinked film, subjecting the uncrosslinked film to actinic radiation in an imagewise pattern (for example, through a photomask) such that exposed areas of the film become crosslinked; and removing the unexposed areas (which remain uncrosslinked and soluble). More specifically, the process can include depositing the photocrosslinkable composition on a substrate to form a film of desired thickness, exposing the film to actinic radiation (for example, flood exposure or irradiation at specific wavelengths in the UV region e.g., the H, I, or G line wavelengths) through a photomask (one having the desired imagewise pattern) to provide crosslinked areas and uncrosslinked areas, and subjecting the film to a developing agent to remove the uncrosslinked areas, thereby transferring the pattern of the photomask in a negative-tone manner to the film.

In various embodiments, crosslinking of the present polymers also can be achieved by other types of energy, for example, with ion beams of charged particles, and electron beams from radioactive sources. Further, in various embodiments, initiators can be used. For example, the initiators can be present as an additive in the coating formulation comprising the present polymers. Examples of initiators can include radical initiators such as azobisisobutyronitrile (AIBN), photoacid generators such as triphenylsulfonium triflate, radical photoinitiators such as diphenyl(2,4,6-trimethylbenzoyl) phosphine oxide (TPO), or photosensitizers such as benzophenone and 1-chloro-4-propoxy-9H-thioxanthen-9-one. Subsequent to the formation of the crosslinked matrix, the thin film material of the present teachings can be subjected to further patterning and process steps, by which additional layers, including additional dielectric, semiconductor and/or conducting layers, can be formed thereon.

Thin film materials prepared from the present photocrosslinkable composition can have good mechanical properties and chemical resistance. For example, after photocrosslinking, the thin film materials can become substantially insoluble in various organic solvents in which the pristine polymer is soluble. More specifically, the photocrosslinked film can be immersed in the mother solvent, for example, for a period of time sufficient to develop the desired pattern, and the loss in the thickness of the film ("thickness loss") can be less than about 50%, preferably less than about 20%, and more preferably less than about 10%.

The present thin film materials generally have excellent dielectric properties. For example, the present thin film materials typically have a dielectric constant of 10 or greater. In various embodiments, the present thin film materials can have a dielectric constant of about 15 or greater. In particular embodiments, the present thin film materials can have a dielectric constant of about 20. When used as a gate dielectric, the present thin film materials can exhibit very low leakage current densities. Leakage current density typically is defined as a vector whose magnitude is the leakage current per cross-sectional area. As used herein, "leakage current" refers to uncontrolled ("parasitic") current flowing across region(s) of a semiconductor structure or device in which no current should be flowing, for example, current flowing across the gate dielectric in a metal-oxide-semiconductor (MOS) structure. As known by those skilled in the art, the leakage current density of a dielectric material can be determined by fabricating a standard metal-insulator-semiconductor (MIS) and/or metal-insulator-metal (MIM) capacitor structures with the dielectric material, then measuring the leakage current, and dividing the measured current by the area of the metal electrodes. As measured from standard MIS and MIM capacitor structures, photopatterned thin film dielectrics according to the present teachings can have a leakage current density of less than or equal to about $2 \times 10^{-3}$ A/cm$^2$ at 1 MV/cm, less than or equal to about $5 \times 10^{-4}$ A/cm$^2$ at 1 MV/cm, or less than or equal to about $2 \times 10^{-4}$ A/cm$^2$ at 1 MV/cm.

Accordingly, photocrosslinked thin films according to the present teachings can be used as a patterned gate dielectric component in various electronic, optical, and optoelectronics devices. Such gate dielectric components can exhibit a wide range of desirable properties and characteristics including, but not limited to, low leakage current densities, high breakdown voltages, large capacitance values, thermal, air and moisture stability, resistance to harsh reagents, and/or compatibility with diverse interlayer, semiconductor and/or metal contact materials (including interfacial compatibility and compatibility with methods used to process such interlayer, semiconductor and/or metallic materials). The electronic, optical, or optoelectronic devices incorporating the present gate dielectric component, in turn, can have improved device performance including, but not limited to, low hysteresis, better stability, and lower operating voltages.

Exemplary solution-processable hydrophobic layer materials includes Telfon AF 1600, Teflon AF 2400, Teflon AF 1601S, Cytop CTL-809M, SYLGARD 184, poly(vinylcyclohexane), poly(styrene), poly(vinylchloride), and poly(propylene). Typical contact angles of hydrophobic coatings known in the art ranges from 90° to 145° (e.g., see K.-Y. Law, Definitions for Hydrophilicity, Hydrophobicity, and Superhydrophobicity: Getting the Basics Right. *The Journal of Physical Chemistry Letters,* 2014, 5, 686).

As noted above, the pixel electrode described herein includes electrical contacts, specifically, a first pixel electrode and a second pixel electrode. In various embodiments as otherwise described herein, one pixel electrode comprises a metal or metal alloy including copper, aluminum, gold, silver, platinum, palladium, molybdenum, nickel, or any mixture thereof, or an electrically conductive polymer such as polyethylenethioxythiophene (PEDOT) and the second pixel electrode comprises a transparent conductive oxide such as an indium (III)-containing or a tin (II or IV)-containing metal oxide. In other embodiments both the first and second pixel electrodes comprise a transparent conducting oxide such as an indium (III)-containing or a tin (II or IV)-containing metal oxide. In preferred embodiments the transparent conducting oxide is indium (III) oxide (ITO).

In various embodiments as otherwise described herein, each of the first pixel electrode and the second pixel electrode have a thickness within the range of 50 nm to 100 nm.

Exemplary spacer materials include PDMS (C. Li, et. al., Fabrication and characterization of flexible electrowetting on dielectrics (EWOD) microlens. *Micromachines,* 2014, 5.3:432-441.), acrylic cell (J. HONG, et al. Three-dimensional digital microfluidic manipulation of droplets in oil medium. *Scientific reports,* 2015, 5.1:1-11.), SU8 (L. HOU, et al. A full description of a scalable microfabrication process for arrayed electrowetting microprisms. *Journal of Micromechanics and Microengineering,* 2009, 20.1:

015044), double-sided adhesive tape (G. J. SHAH, et al. EWOD-driven droplet microfluidic device integrated with optoelectronic tweezers as an automated platform for cellular isolation and analysis. *Lab on a Chip,* 2009, 9.12:1732-1739), Polyimde (W. C. NELSON, et. al., Monolithic fabrication of EWOD chips for picoliter droplets. *Journal of microelectromechanical systems,* 2011, 20.6:1419-1427).

Exemplary microfluid droplet materials include DI water, PBS solution (T. KREMERS, et al. PortaDrop: A portable digital microfluidic platform providing versatile opportunities for Lab-On-A-Chip applications. *PloS one,* 2020, 15.9: e0238581), NaCl solution (J. HONG, et al. Three-dimensional digital microfluidic manipulation of droplets in oil medium. *Scientific reports,* 2015, 5.1:1-11.), SDS solution, KCL solution (I. KHAN, et. al., Fabrication of solar beam steering electrowetting devices—present status and future prospects. *Journal of Physics D: Applied Physics,* 2017, 50.40:403001), LiCl solution (Y. TAKAI, et al. Electrowetting fresnel lenticular. In: *2012 IEEE 25th International Conference on Micro Electro Mechanical Systems* (MEMS). IEEE, 2012. 632-635), ionic liquids (S. Milleriorini, et al. Electrowetting of ionic liquids. *Journal of the American Chemical Society,* 2006, 128.9:3098-3101)

Exemplary immiscible fluid materials include silicon oil (D. Brassard, et al. Water-oil core-shell droplets for electrowetting-based digital microfluidic devices. *Lab on a Chip,* 2008, 8.8:1342-1349), dodecane oil (I. KHAN, et. al., Fabrication of solar beam steering electrowetting devices—present status and future prospects. *Journal of Physics D: Applied Physics,* 2017, 50.40:403001)

EXAMPLES

Materials

Polyethylene Naphthalate (PEN) and Polyethylene Terephthalate (PET) were received from Dupont Teijin Films. Polyimide (PI) was received from Toyobo Co., LLC. Silver, molybdenum, and ITO sputter targets were purchased from Furuya Metal Co., Plansee LLC, and Nikko Metals, respectively. IGZO and ZrOx sputter targets were purchased from AJA international. $HfOCl_2$ was purchased from Aldrich. Printable Ag nanoparticle ink was purchased from Inktek Co. Printable ITO nanoparticle ink was purchased from Evonik Industries. PBS tablets was purchased from Aldrich. PVDF-TRFE-CTFE (PFCE) was purchased from Arkema. Additive polydimethylsiloxane (PDMS) and immiscible fluid silicon oil were purchased from Gelest Inc. PVC was purchased from Aldrich.

Semiconductor PDI, e.g. structure 2a used in the Examples, was synthesized according to U.S. Pat. No. 7,902,363, which is hereby incorporated herein by reference in its entirety. Crosslinkable polymer B2000, of structure 6 used in the Examples, was synthesized according to U.S. Pat. No. 7,981,889, which is hereby incorporated herein by reference in its entirety. M36, of structure 4 used in the Examples, was synthesized according to U.S. Pat. No. 8,878,169, which is hereby incorporated herein by reference in its entirety.

Example 1 (S1). An Electrowetting on Dielectric (EWOD) device system having 4800 pixels of structure as shown in FIG. 1A, hereinafter referred as pixel structure 100, was fabricated on soda lime glass substrates. The substrate was coated with a polymer buffer layer prepared by spin-coating a solution of B2000 in an ester solvent (100 mg/ml; 1500 rpm) onto the substrates to afford a ~500 nm-thick layer. This film was crosslinked by UV light (HPM, 2 J/cm$^2$, then 110° C., 5 minutes) to afford a robust, insoluble buffer layer. Next, the metal source and drain electrodes (Ag, 100 nm thick) were prepared by sputtering followed by photolithography. Channel length and width were 15 μm and 100 μm, respectively. A contact modification layer was applied (~2 wt. % of an arenethiol in an ether solvent, puddling 5 min., spin dry) on contacts to improve the semiconductor/contact interface. The dicyano-functionalized perylene diimide (PDI) semiconductor was deposited by spin coating (concentration ~2 mg/mL in a hydrocarbon mixture, ~1000 rpm, film dried on a hotplate at ~110° C. for 5 minutes) and patterned by photolithography to form the transistor channel. Typical semiconductor film thicknesses were ~30 nm. Next, the polymer gate dielectric layer (~800 nm thick, k~3.3) was prepared by spin-coating a M36 solution in an ester solvent (~120 mg/mL, 1000 rpm), crosslinked by UV light (HPM 0.6 J/cm$^2$) and patterned by photolithography. The transistors were completed by deposition of the metal gate electrode (Ag, 100 nm thick) by sputtering and photolithography patterning. On top of the transistor layers, a polymeric planarization layer (2 μm in thickness) was deposited by spin-coating a solution of M36 polymer in an ester solvent (~300 mg/mL, ~1000 rpm), crosslinking by UV light (HPM 0.6 J/cm$^2$) and patterning by photolithography, followed by sputtering if ITO (~80 nm in thickness) and photolithographic patterning of a pixel electrode to complete the active-matrix array. A high-k polymeric material (PFCE in an ester solution, ~80 mg/mL) was spin-coated (~1000 rpm) to afford a 500 nm-thick pixel dielectric layer (k~ 13), followed by spin-coating of a polymeric hydrophobic layer (~20 nm in thickness), achieved by spin-coating a PVC solution (~4 mg/mL in a hydrocarbon solvent, spin rate 1000 rpm). On another glass substrate, a pixel electrode (ITO, ~80 nm) was established by sputtering and photolithographic patterning, followed by subsequent spin coating of a high-k polymeric pixel dielectric layer (~500 nm in thickness, k~13, from a PFCE in an ester solution, ~80 mg/mL, spin-coating) and a hydrophobic layer (~20 nm in thickness, from a PVC solution, ~4 mg/mL, spin-coating) This substrate was then flipped over and aligned with bottom substrate bearing a vertical gap (~2000 μm in distance) created by an acrylic spacer between the substrates. The droplet (Phosphate Buffered Saline, PBS, 137 mM NaCl, 2.7 mM KCl, 8 mM $Na_2HPO_4$, and 2 mM $KH_2PO_4$ in water, droplet size ~1 μL) movement was tested as reported in Example 26.

Example 2 (S2). An Electrowetting on Dielectric (EWOD) device system having 4800 pixels of structure 100 was fabricated as described in Example 1, but using a polyethylene naphthalate (PEN) substrate (thickness ~50 μm).

Example 3 (S3). An Electrowetting on Dielectric (EWOD) device system having 4800 pixels of structure 100 was fabricated as described in Example 2 but using M36 as the polymer buffer layer (~120 mg/mL in an ester solvent, spin-coating ~1000 rpm, ~800 nm in thickness).

Example 4 (S4). An Electrowetting on Dielectric (EWOD) device system having 4800 pixels of structure 100 was fabricated as described in Example 2, but using sputtered Mo as source, drain and gate electrodes (~100 nm patterned by photolithography) of the OTFT active-matrix array.

Comparative Example 5 (C5). An Electrowetting on Dielectric (EWOD) device system having 4800 pixels of structure 100 was fabricated as indicated in Example 4 but using SiNx (300 nm, k~7.5, deposited by PECVD at 300°

C.) as an inorganic gate dielectric layer. This example does not comprise an organic polymer in the gate dielectric material.

Comparative Example 6 (C6). An Electrowetting on Dielectric (EWOD) device system having 4800 pixels of structure 100 was fabricated as indicated in Example, 3 but using SiNx (100 nm, k~7.5, deposited by PECVD at 300° C.) as the inorganic pixel dielectric layers. This Example does not comprise an organic polymer in the pixel dielectric material.

Comparative Example 7 (C7). An Electrowetting on Dielectric (EWOD) device system having 6400 pixels of structure 100 with the sole difference of TFT structure 130 was fabricated adopting back gated amorphous Si (a-Si) TFT array on PEN substrates. In this system the a-Si TFT structure is bottom-gate top-contact as reported by T.-S. Chang, et. al., IEEE Electron Device Letters, 27, 902 (2006). First, a 300 nm SiNx buffer layer was deposited by PECVD at 300° C., followed by sputtering of Mo bottom gate electrode ~100 nm in thickness and patterning by photolithography process. A tri-layer stack, 300 nm SiNx gate dielectric/200 nm a-Si channel layer/50 nm N+ contact layer was deposited subsequently in PECVD process at temperature 360° C., a-Si island was patterned by photolithograph. Then a 100 nm Molly S/D electrode was deposited by sputter and patterned by photolithography followed by selective RIE dry etching of N+ layer in the channel region. The channel length and channel width of the TFT were 10 μm and 50 μm, respectively. A 200 nm SiNx planarization layer was then deposited by PECVD at 300° C. and patterned by photolithography. The active matrix a-Si TFT array was completed by an 80 nm ITO pixel electrode layer sputtered and patterned by photolithography and a 230° C. final annealing process. A high-k polymeric material (PFCE in an ester solution, ~80 mg/mL) was spin-coated (~1000 rpm) to afford a 500 nm-thick pixel dielectric layer, followed by spin-coating of a polymeric hydrophobic layer (~20 nm in thickness), achieved by spin-coating a PVC solution (~4 mg/mL in an hydrocarbon solvent, spin rate 1000 rpm). On another PEN substrate, a pixel electrode (ITO, ~80 nm) was established by sputtering and photolithographic patterning, followed by subsequent spin coating of a high-k polymeric pixel dielectric layer (~500 nm in thickness, from a PFCE in an ester solution, ~80 mg/ml, 1000 rpm, spin-coating) and an hydrophobic layer (~20 nm in thickness, from a PVC solution, ~4 mg/mL, spin-coating). This substrate was then inverted and aligned with bottom substrate bearing a vertical gap (~2000 μm in distance) created by an acrylic spacer between the substrates. This Example does not comprise an organic transistor.

Comparative Example 8 (C8). An Electrowetting on Dielectric (EWOD) device system having 4800 pixels of structure 100 was fabricated as indicated in Example 4 but using IGZO (sputtered, ~50 nm, 100 W, 3×10$^{-3}$ torr, annealed in N$_2$ at 250° C. for 1 hr) as semiconductor layer. In addition, ZrOx (~300 nm, 80 W, 3×10$^{-3}$ torr, annealed in N$_2$ at 300° C. for 1 hr, k~32) was sputtered as inorganic pixel dielectric layers. This Example does not comprise an organic transistor.

Example 9 (S9). An Electrowetting on Dielectric (EWOD) device system having 4800 pixels of structure 100 was fabricated as indicated in Example 3, but using a high-k polymeric gate dielectric layer (~500 nm in thickness, k~11, spin coating from a PFCE in an ester solution, ~80 mg/mL, 1000 rpm, crosslinked under Ar and O$_2$ plasma).

Comparative Example 10 (C10). An Electrowetting on Dielectric (EWOD) device system having 4800 pixels of structure 100 was fabricated as indicated in Example, 3 but using ZrOx (~300 nm, 80W, 3×10$^{-3}$ torr, annealed in N$_2$ at 300° C. for 1 hr, k~32) as a high-k inorganic gate dielectric layer. This Example does not comprise an organic polymer in the gate dielectric material.

Example 11 (S11). An Electrowetting on Dielectric (EWOD) device system having 100 pixels of structure 100 was fabricated as indicated in Example 3, but using a Labratester 180 gravure printer. M36 in an ester solvent (70 mg/mL) was printed onto the PEN substrates to afford a ~500 nm-thick polymeric buffer layer. This film was cross-linked by UV light (HPM, 2 J/cm$^2$, then 110° C., 5 minutes) to afford a robust, completely insoluble buffer layer. Next, the metal source-drain electrical electrodes (~100 nm thick) were printed from Ag ink and annealed at 150° C. for 30 mins. Channel length and width were 100 μm and 2000 μm, respectively. A dicyano-functionalized perylene diimide (PDI) semiconductor was printed (concentration ~1 mg/mL in a hydrocarbon mixture, film dried on a hotplate at ~110° C. for 5 minutes). Typical semiconductor film thicknesses were ~50 nm. Next, the polymer gate dielectric layer (~800 nm thick, k~3.3) was prepared by printing a solution of M36 in an ester solvent (~100 mg/mL) and crosslinked by UV light (HPM, 0.6 J/cm$^2$). The transistors were completed by printing of the metal gate electrode (Ag, 100 nm thick, annealed at 120° C. for 30 mins). On top of the transistor layers, a polymeric planarization layer (~1 μm in thickness) was deposited by printing a M36 solution in an ester solvent (~200 mg/mL) and crosslinked by UV light (HPM, 0.6 J/cm$^2$), followed by printing ITO pixel electrode (~100 nm thick, annealed at 120° C. for 30 mins) to complete the active-matrix array. A high-k polymeric material (PFCE in an ester solution, ~60 mg/mL) was printed to afford a 500 nm-thick pixel dielectric layer (k~13), followed by printing of a polymeric hydrophobic layer (~20 nm in thickness) from a PVC solution (~3 mg/mL in an hydrocarbon solvent). On another PEN substrate, a pixel electrode (ITO, ~100 nm thick, annealed at 120° C. for 30 mins) was printed, followed by subsequent printing of a high-k polymeric pixel dielectric layer (~500 nm in thickness, k~13, from a PFCE in an ester solution, ~60 mg/mL) and an hydrophobic layer (~20 nm in thickness, from a PVC solution, ~3 mg/mL) This substrate was then inverted and aligned with bottom substrate bearing a vertical gap (~2000 μm in distance) created by an acrylic spacer between the substrates.

Example 12 (S12). An Electrowetting on Dielectric (EWOD) device system having 4800 pixels of structure 100 was fabricated as indicated in Example 3, but using thin polymer high-k pixel dielectric layers (~200 nm in thickness, k~13, spin coating from a PFCE in an ester solution, ~30 mg/mL).

Example 13 (S13). An Electrowetting on Dielectric (EWOD) device system having 4800 pixels of structure 100 was fabricated as indicated in Example 3, but using polyimide (PI) substrates (thickness ~38 μm).

Example 14 (S14). An Electrowetting on Dielectric (EWOD) device system having 4800 pixels of structure 100 was fabricated as indicated in Example 3, but using polyethylene terephthalate (PET) substrates (thickness ~50 μm). All baking steps were carried out at ~80° C. for about 20-30 mins.

The materials of critical layers as well as EWOD testing results for Examples 1~14 (Sample Example S1-S4, S9, S11-S14- and Comparative Examples C5-C8, C10) are summarized in Table 1.

TABLE 1

Summary of materials used for fabricating Electrowetting on Dielectric (EWOD) device system having pixels of structure 100.[1-3]

| Examples | Process | Sub. (110, 110') | Buf. (120) | OTFT El. (131, 132, 133) | SC (134) | Gate Diel. (135) | PLN (140) | Pixel El. (150, 150') | Pixel Diel. (160, 160') | HL (170, 170') | EWOD Working |
|---|---|---|---|---|---|---|---|---|---|---|---|
| S1 | PL | Glass | B2000 | Ag | PDI | M36 | M36 | ITO | PFCE | PVC | Yes |
| S2 | PL | PEN | B2000 | Ag | PDI | M36 | M36 | ITO | PFCE | PVC | Yes |
| S3 | PL | PEN | M36 | Ag | PDI | M36 | M36 | ITO | PFCE | PVC | Yes |
| S4 | PL | PEN | M36 | Mo | PDI | M36 | M36 | ITO | PFCE | PVC | Yes |
| C5 | PL | PEN | M36 | Mo | PDI | SiNx | M36 | ITO | PFCE | PVC | No |
| C6 | PL | PEN | M36 | Ag | PDI | M36 | M36 | ITO | SiNx | PVC | No |
| C7 | PL | PEN | SiNx | Mo | aSi | SiNx | SiNx | ITO | PFCE | PVC | No |
| C8 | PL | PEN | M36 | Mo | IGZO | M36 | M36 | ITO | ZrOx | PVC | No |
| S9 | PL | PEN | M36 | Ag | PDI | PFCE | M36 | ITO | PFCE | PVC | Yes |
| C10 | PL | PEN | M36 | Ag | PDI | ZrOx | M36 | ITO | PFCE | PVC | No |
| S11 | GP | PEN | M36 | Ag | PDI | M36 | M36 | ITO | PFCE | PVC | Yes |
| S12 | PL | PEN | M36 | Ag | PDI | M36 | M36 | ITO | PFCE (200 nm) | PVC | Yes |
| S13 | PL | PI | M36 | Ag | PD | M36 | M36 | ITO | PFCE | PVC | Yes |
| S14 | PL | PET | M36 | Ag | PDI | M36 | M36 | ITO | PFCE | PVC | Yes |

[1]In all Examples the spacer (185) is acrylic cell, immiscible fluid (180) is silicon oil and the microfluid droplet (190) is a PBS solution.
[2]PL = Photolithography; GP = Gravure printing; Sub. = substrate; Buf. = Buffer Layer; OTFT El. = OTFT Electrodes; Gate Diel. = Gate Dielectric Layer; PLN = Planarization layer; Pixel El. = Pixel Electrodes; Pixel Diel. = Pixel Dielectric Layer; HL = Hydrophobic Layer.
[3]For control Example 7 the TFT structure is back-gated.

Example 15 (S15). An Electrowetting on Dielectric (EWOD) device system having 4800 pixels of structure as shown in FIG. 2A, hereinafter referred as pixel structure 200, was fabricated on soda lime glass substrates. The substrate was coated with a polymer buffer layer prepared by spin-coating a solution of M36 in an ester solvent (120 mg/ml; 1000 rpm) onto the substrates to afford ~800 nm-thick layers. These film were crosslinked by UV light (HPM, 2 J/cm$^2$, then 110° C., 5 minutes) to afford a robust, completely insoluble buffer layer. Next, the metal source-drain electrical electrodes (Ag, 100 nm thick) were prepared by sputtering followed by photolithography. Channel length and width were 15 μm and 100 μm, respectively. A contact modification layer was applied (~2 wt. % of an arenethiol in an ether solvent, puddling 5 min., spin dry) on contacts to improve semiconductor/contact interface. The dicyano-functionalized perylene diimide (PDI) semiconductor was deposited by spin coating (concentration ~2 mg/ml in a hydrocarbon mixture, ~1000 rpm, film dried on a hotplate at ~110° C. for 5 minutes) and patterned by photolithography to form the transistor channel. Typical semiconductor film thicknesses were ~30 nm. Next, the polymer gate dielectric layer (~800 nm thick, k~3.3) was prepared by spin-coating a solution of M36 in an ester solvent (~120 mg/mL, 1000 rpm), crosslinking by UV light (HPM, 0.6 J/cm$^2$) and patterning by photolithography. The transistors were completed by deposition of the metal gate electrode (Ag, 100 nm thick) by sputtering and photolithographic patterning. On top of the transistor layers, a polymeric planarization layer (2 μm in thickness) was deposited by spin-coating a solution of M36 in an ester solvent (~300 mg/mL, ~1000 rpm), crosslinking by UV light (HPM, 0.6 J/cm$^2$) and patterning by photolithography, followed by sputtering (ITO, ~80 nm in thickness) and photolithographic patterning of a pixel electrode to complete the active-matrix array. A surfactant-modified high-k polymeric material PFCE-H (~80 mg/mL PFCE, ~4 mg/mL PDMS in an ester solution) was spin-coated (~1000 rpm) to afford a 500 nm-thick pixel dielectric layer (k~11) The PFCE-H layer had a contact angle to Phosphate Buffered Saline (PBS) of ~100°. On another glass substrate, a pixel electrode (ITO, ~80 nm) was established by sputtering and photolithographic patterning, followed by spin coating of a surfactant-modified high-k polymeric pixel dielectric layer PFCE-H (~500 nm in thickness, k~11, from ~80 mg/mL PFCE, ~4 mg/mL PDMS in an ester solution, spin-coating 1000 rpm). This substrate was then flipped over and aligned with bottom substrate bearing a vertical gap (~2000 μm in distance) created by an acrylic spacer between the substrates.

Example 16 (S16). An Electrowetting on Dielectric (EWOD) device system having 4800 pixels of structure 200 was fabricated as described in Example 15, but using polyethylene naphthalate (PEN) substrates (thickness ~50 μm).

Comparative Example 17 (C17). An Electrowetting on Dielectric (EWOD) device system having 4800 pixels of structure 200 was fabricated as indicated in Example 15 but using SiNx (300 nm, deposited by PECVD at 300° C., k~7.5) as inorganic gate dielectric layer. This Example does not comprise an organic polymer in the gate dielectric material.

Comparative Example 18 (C18). An Electrowetting on Dielectric (EWOD) device having 6400 pixels of structure 200 with the sole difference of TFT structure 230 was fabricated adopting back-gated amorphous Si (a-Si) TFT array on a PEN substrate. In this system the a-Si TFT structure is bottom-gate top-contact as reported by T.-S. Chang, et. al., IEEE Electron Device Letters, 27, 902 (2006). First, a 300 nm SiNx buffer layer was deposited by PECVD at 300° C., followed by sputtering of Mo bottom gate electrode ~100 nm in thickness and patterning by photolithography. A tri-layer stack, 300 nm SiNx gate dielectric/200 nm a-Si channel layer/50 nm N+ contact layer was deposited subsequently via PECVD at temperature 360° C.; a-Si islands were patterned by photolithography. Then a 100n m Molly S/D electrode was deposited by sputtering and photolithographic patterning followed by selective RIE dry etching of N+ layer in the channel region. The channel length and channel width of the TFT were 10 μm and 50 μm, respectively. A 200 nm SiNx planarization layer was then deposited by PECVD at 300° C. and patterned by photolithography. The active-matrix a-Si TFT array was completed by sputtering a 80 nm ITO pixel electrode layer and patterning by photolithography followed by a 230° C. final annealing process. A surfactant-modified high-k polymeric material PFCE-H (~80 mg/mL PFCE, ~4 mg/mL PDMS in an ester solution, k~11) was spin-coated (~1000 rpm) to afford a 500 nm-thick pixel dielectric layer. The PFCE-H layer had a contact angle to Phosphate Buffered Saline (PBS) of ~100°. On another PEN substrate, a pixel electrode (ITO, ~80 nm) was established by sputtering and photolithography patterning, followed by spin coating of a surfactant-modified high-k polymeric pixel dielectric layer PFCE-H (~500 nm in thickness, from ~80 mg/mL PFCE, ~4 mg/mL PDMS in an ester solution, spin-coating 1000 rpm, k~11). This substrate was then inverted and aligned with bottom substrate bearing a vertical gap (~2000 µm in distance) created by an acrylic spacer between the substrates. This Example does not comprise an organic transistor.

Example 19 (S19). An Electrowetting on Dielectric (EWOD) device system having 4800 pixels of structure 200 was fabricated as indicated in Example 15 but using high-k polymeric gate dielectric layer PFCE (~500 nm in thickness, k~11, spin coating from ~80 mg/ml PFCE in an ester solution, 1000 rpm, crosslinked under Ar and $O_2$ plasma).

Comparative Example 20 (C20). An Electrowetting on Dielectric (EWOD) device system having 4800 pixels of structure 200 was fabricated as indicated in Example 15, but using a solution-processed high-k HfOx (deposited by spin-coating 0.1M $HfOCl_2$ solution in 2ME, 2000 rpm, annealing at 250° C. for 30 min, k~24) as inorganic gate dielectric layer (~180 nm thick). This Example does not comprise an organic polymer in the gate dielectric material.

The materials of critical layers as well as EWOD testing results for Examples 15~20 (Sample Examples S15, S16, S19 and Comparative Examples C17, C18, C20) are summarized in Table 2.

solvent, puddling 5 min., spin dry) on contacts to improve semiconductor/contact interface. The dicyano-functionalized perylene diimide (PDI) semiconductor was deposited by spin coating (concentration ~2 mg/mL in a hydrocarbon mixture, ~1000 rpm, film dried on a hotplate at ~110° C. for 5 minutes) and patterned by photolithography to form the transistor channel. Typical semiconductor film thicknesses were ~30 nm. Next, a high-k polymeric gate dielectric layer PFCE was spin-coated, (~500 nm in thickness, k~11, ~80 mg/mL PFCE in an ester solution), crosslinked under Ar and $O_2$ plasma and patterned by photolithography. The transistors were completed by deposition of the metal gate electrode (Ag, 100 nm thick) by sputtering and photolithography patterning. A surfactant-modified high-k polymeric material PFCE-H (~80 mg/mL PFCE, ~4 mg/mL PDMS in an ester solution) was spin-coated (~1000 rpm) to afford a 500 nm-thick pixel dielectric layer (k~11), The PFCE-H layer had a contact angle to Phosphate Buffered Saline (PBS) of ~100°. On another PEN substrate, a pixel electrode (ITO, ~80 nm) was established by sputtering and photolithography patterning, followed by spin coating of a surfactant-modified high-k polymeric pixel dielectric layer PFCE-H (~500 nm in thickness, from ~ 80 mg/mL PFCE, ~4 mg/mL PDMS in an ester solution, spin-coating 1000 rpm). This substrate was then inverted and aligned with bottom substrate bearing a vertical gap (~2000 µm in distance) created by an acrylic spacer between the substrates.

Example 22 (S22). An Electrowetting on Dielectric (EWOD) device system having 4800 pixels of structure 300 was fabricated as indicated in Example 21, but using a surfactant-modified high-k polymeric material PFCE-H as gate dielectric layer (~500 nm thick, k~11, ~80 mg/mL

TABLE 2

Summary of materials used for fabricating Electrowetting on Dielectric (EWOD) device system having pixels of structure 200.[1-3]

| Examples | Process | Sub. (210, 210') | Buf. (220) | OTFT El. (231, 232, 233) | SC (234) | Gate Diel. (235) | PLN (240) | Pixel El. (250, 250') | Pixel Diel. (267, 267') | EWOD Working |
|---|---|---|---|---|---|---|---|---|---|---|
| S15 | PL | Glass | M36 | Ag | PDI | M36 | M36 | ITO | PFCE-H | Yes |
| S16 | PL | PEN | M36 | Ag | PDI | M36 | M36 | ITO | PFCE-H | Yes |
| C17 | PL | PEN | M36 | Ag | PDI | SiNx | M36 | ITO | PFCE-H | No |
| C18 | PL | PEN | SiNx | Mo | aSi | SiNx | SiNx | ITO | PFCE-H | No |
| S19 | PL | PEN | M36 | Ag | PDI | PFCE | M36 | ITO | PFCE-H | Yes |
| C20 | PL | PEN | M36 | Ag | PDI | HfOx | M36 | ITO | PFCE-H | No |

[1]In all Examples the spacer (285) is acrylic cell, immiscible fluid (280) is silicon oil and the microfluid droplet (290) is a PBS solution.
[2]PL = Photolithography; GP = Gravure printing; Sub. = substrate; Buf. = Buffer Layer; OTFT El. = OTFT Electrodes; Gate Diel. = Gate Dielectric Layer; PLN = Planarization layer; Pixel El. = Pixel Electrodes; Pixel Diel. = Pixel Dielectric Layer.
[3]For control Example 18 the TFT structure is back-gated.

Example 21 (S21). An Electrowetting on Dielectric (EWOD) device system having 4800 pixels as shown in FIG. 3A, hereinafter referred as pixel structure 300, was fabricated on polyethylene naphthalate (PEN) substrates (thickness ~50 µm). The substrate was coated with a polymer buffer layer prepared by spin-coating a solution of M36 in an ester solvent (120 mg/mL, 1000 rpm) onto the substrates to afford a ~800 nm-thick layer. This film was crosslinked by UV light (HPM 2 J/cm², then 110° C., 5 minutes) to afford a robust, completely insoluble buffer layer. Next, the metal source-drain electrical electrodes (Ag, 100 nm thick) were prepared by sputtering followed by photolithography. Channel length and width were 15 µm and 100 µm, respectively. A contact modification layer was optionally applied (~2 wt. % of an arenethiol in an ether PFCE, ~4 mg/mL PDMS in an ester solution, spin-coated ~1000 rpm, crosslinked under Ar and $O_2$ plasma and patterned by photolithography).

Comparative Example 23 (C23). An Electrowetting on Dielectric (EWOD) device having 4800 pixels of structure 300 was fabricated as indicated in Example 21 but using SiNx (300 nm, deposited by PECVD at 300° C., k~7.5) as inorganic gate dielectric layer. This Example does not comprise an organic polymer in the gate dielectric material.

Comparative Example 24 (C24). An Electrowetting on Dielectric (EWOD) device having 4800 pixels of structure 300 was fabricated as indicated in Example 21, but using solution-processed high-k HfOx (deposited by spin-coating 0.1M $HfOCl_2$ solution in 2ME, 2000 rpm, annealing at 250° C. for 30 min, k~24) as inorganic gate dielectric layer (~180 nm thick). This Example does not comprise an organic polymer in the gate dielectric material.

The materials of critical layers as well as EWOD testing results for Examples 21~24 (Sample Examples S21, S23, Comparative Examples C23, C24) are summarized in Table 3.

TABLE 3

Summary of materials used for fabricating Electrowetting on Dielectric (EWOD) device system having pixels of structure 300.[1,2]

| Examples | Process | Sub. (310, 310') | Buf. (320) | OTFT El. (331, 332, 333) | SC (334) | Gate Diel. (335) | Pixel El. (350') | Pixel Diel. (367, 367') | EWOD Working |
|---|---|---|---|---|---|---|---|---|---|
| S21 | PL | PEN | M36 | Ag | PDI | PFCE | ITO | PFCE-H | Yes |
| S22 | PL | PEN | M36 | Ag | PDI | PFCE-H | ITO | PFCE-H | Yes |
| C23 | PL | PEN | M36 | Ag | PDI | SiNx | ITO | PFCE-H | No |
| C24 | PL | PEN | M36 | Ag | PDI | HfOx | ITO | PFCE-H | No |

[1]In all Examples the spacer (385) is acrylic cell, immiscible fluid (380) is silicon oil and the microfluid droplet (390) is a PBS solution.
[2]PL = Photolithography; GP = Gravure printing; Sub. = substrate; Buf. = Buffer Layer; OTFT El. = OTFT Electrodes; Gate Diel. = Gate Dielectric Layer; Pixel El. = Pixel Electrodes; Pixel Diel. = Pixel Dielectric Layer.

EWOD devices were measured as described in Example 26 (below) and defined as "functioning" if the fluidic droplet can be moved from one pixel to nearby ones.

Example 25. To test the EWOD devices, a customized universal driving box is used to supply voltage signals to all the scan line (connected to the gate electrode of each TFT) and the data line (connected to the source electrode of each TFT) of the TFT array. In the first stage, scan lines were set to +20V to turn on the TFT for pixel 1~6 (P1~P6), while data line signals of P1 and P4 were set as ground (0V), data line signal of P2, P3, P5, P6 were at +40V, droplet was found to gradually move from P1 towards P2. In the second stage, data line signals of P2 and P5 were switched to ground (0V) and P3 and P6 were kept at +40V, and the droplet was driven towards P3, continue the process allowed the droplet to move along horizontal direction. Vertical motion was achieved similarly by switching the signals of the pixels in the vertical direction.

Figure 4:
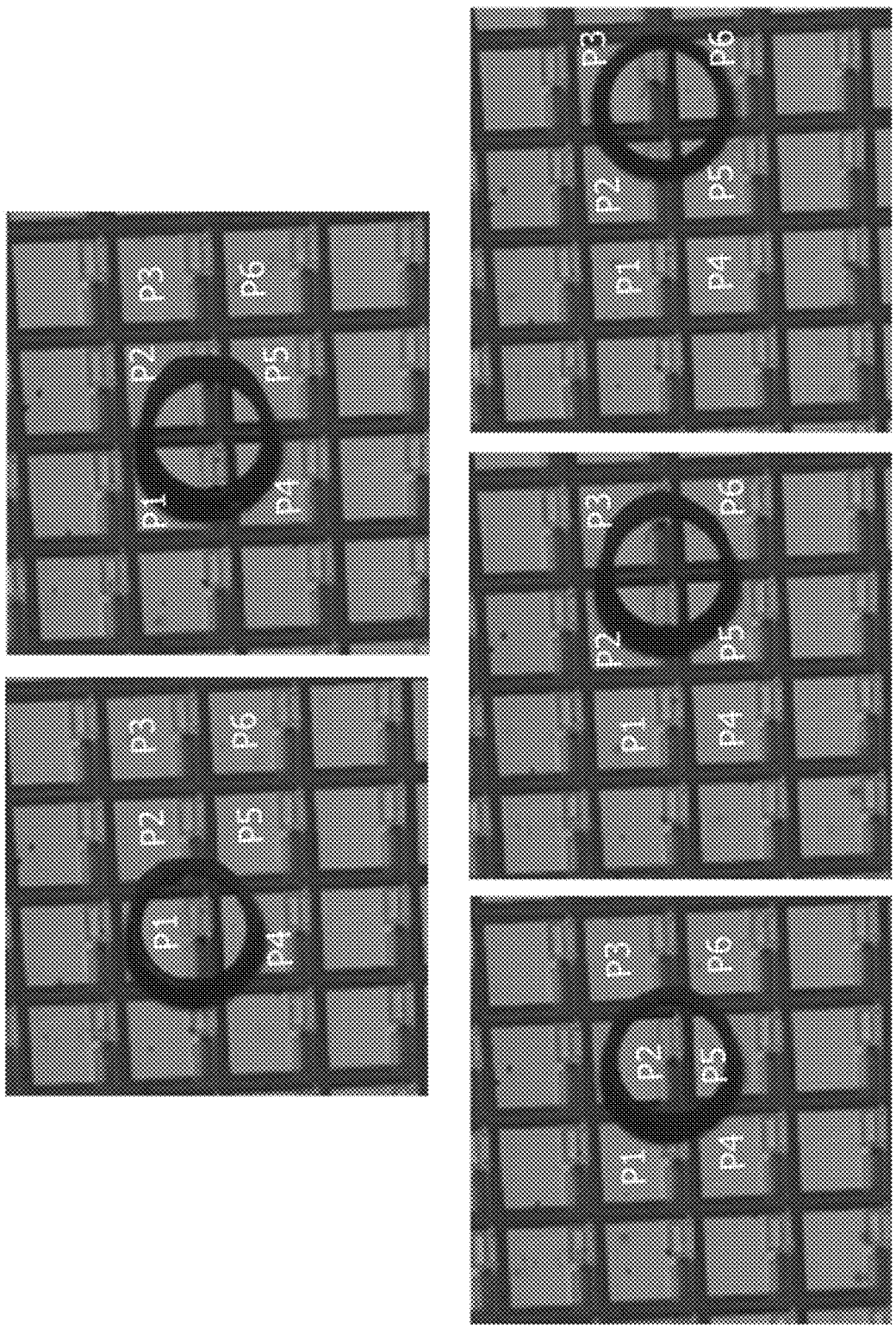
FIG. 4 is a set of optical microscope photos illustrating the movement of microfluid PBS droplets on an array of pixels according to the FIG. 1A embodiment.

For all the Examples (S1-S4, S9, S11-S16, S19, S21, S23) made according to present invention above-described successful movement and control of a droplet has been achieved under operation voltage of +40V A typical response is shown in FIG. 4, showing the movement of a fluid droplet, observable as upper substrate and all of the elements above the droplets are transparent. Pixels P1-P6 has been made according to Example 3

Whereas for comparative examples (C5-C8, C10, C17, C18, C20, C23, C24), where one or a few organic layers were replaced by inorganic layers, the structure was not able to drive the droplet to move between pixels under operation voltage as high as +80V.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural features or aspects of the invention in more detail than is necessary for the fundamental understanding of the invention, the description taken with the drawings and/or examples enabling to those skilled in the art to understand how the several forms of the invention may be embodied in practice and how to make them. Thus, before the disclosed processes and devices are described, it is to be understood that the aspects described herein are not limited to specific embodiments, apparatuses, or configurations, and as such can, of course, vary. It is also to be understood that the terminology used herein is for the purpose of describing particular aspects only and, unless specifically defined herein, is not intended to be limiting but encompasses equivalent terms, as understood as such by a person having ordinary skill in the art.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It is also to be underlined that present invention is not limited to a specific type of transistor, namely the so-called bottom gate top contact, bottom gate bottom contact, top gate bottom contact and top gate top contact configurations, such as shown for example in FIGS. 1-4 and their relative description in the U.S. Pat. No. 10,535,822 whose teaching are herein incorporated by reference.

All methods described herein can be performed in any suitable order of steps unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

As will be understood by one of ordinary skill in the art, each embodiment disclosed herein can comprise, consist essentially of or consist of its particular stated element, step, ingredient or component. As used herein, the transition term "comprise" or "comprises" means includes, but is not limited to, and allows for the inclusion of unspecified elements, steps, ingredients, or components, even in major amounts. The transitional phrase "consisting of" excludes any element, step, ingredient or component not specified. The transition phrase "consisting essentially of" limits the scope of the embodiment to the specified elements, steps, ingredients or components and to those that do not materially affect the embodiment.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. When further clarity is required, the term "about" has the meaning reasonably ascribed to it by a person skilled in the art when used in conjunction with a stated numerical value or range, i.e., denoting somewhat more or somewhat less than the stated value or range, to within the degree of precision typical in the art and typically within 10%.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Some embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, numerous references have been made to patents and printed publications throughout this specification. Each of the cited references and printed publications are individually incorporated herein by reference in their entirety.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein or different elements of the alternate embodiments combined together. Accordingly, the present invention is not limited to that precisely as shown and described.

EMBODIMENTS

Embodiment 1. A fluidic droplet pixel, the fluidic droplet pixel comprising:
  a first platform comprising a first substrate, a first pixel electrode disposed on the first substrate, and a first pixel dielectric layer disposed on the first substrate, the first pixel electrode being disposed between the first substrate and the first pixel dielectric layer, the first platform presenting a first hydrophobic surface opposite the first substrate,
  the first platform further comprising an organic thin film transistor (OTFT) comprising source and drain electrodes separated by an organic semiconductor channel, and a gate electrode separated by the source and drain electrodes by a gate dielectric layer, said organic thin film transistor being disposed between the first substrate and the first hydrophobic surface, and
  a second platform comprising a second substrate, a second pixel electrode disposed on the second substrate, and a second pixel dielectric layer disposed on the second substrate, the second pixel electrode being disposed between the second substrate and the second pixel dielectric layer, the second platform presenting a second hydrophobic surface opposite the second substrate;
  wherein the first hydrophobic surface and the second hydrophobic surface define boundaries of a fluidic channel between the first platform and the second platform; and
  wherein each of the gate dielectric layer, the first pixel dielectric layer, and the second pixel dielectric layer comprise an organic polymer; and
  the organic thin film transistor is configured to provide a switchable voltage bias between the first pixel electrode and the second pixel electrode.

Embodiment 2. A fluidic droplet pixel according to embodiment 1 wherein the substrate is soda lime glass, or a plastic having a glass transition temperature in the range of 50-250° C.

Embodiment 3. A fluidic droplet pixel driver according to embodiment 2, wherein the substrate is a plastic selected from polyethylene terephthalate, polyethylene naphthalate, and a polyimide.

Embodiment 4. A fluidic droplet pixel driver according to any of embodiments 1-3, wherein the drain electrode of the OTFT is also the first pixel electrode.

Embodiment 5. A fluidic droplet pixel according to any of embodiments 1-3, wherein the drain electrode of the OTFT is in electrical contact with the first pixel electrode.

Embodiment 6. A fluidic droplet pixel according to any of embodiments 1-5, wherein a planarization layer separates the OTFT from the first pixel electrode by a planarization dielectric layer, optionally wherein the planarization dielectric layer comprises a dielectric polymer.

Embodiment 7. A fluidic droplet pixel according to embodiment 6, wherein the planarization layer comprises a polymer from structure 4 or 5, or 6.

Embodiment 8. A fluidic droplet pixel according to embodiment 6 or embodiment 7, wherein the planarization dielectric layer is formed from the same chemical composition as the gate dielectric layer.

Embodiment 9. A fluidic droplet pixel according to any of embodiments 1-8, wherein the first hydrophobic surface is provided by a surface of the first pixel dielectric layer, and/or the second dielectric surface is provided by a surface of the second pixel dielectric layer.

Embodiment 10. A fluidic droplet pixel according to any of embodiments 1-8, wherein the first hydrophobic surface is provided by a first hydrophobic layer provided on the first platform separate from the first pixel dielectric layer, and/or the second hydrophobic surface is provided by a second hydrophobic layer provided on the second platform separate from the second pixel dielectric layer.

Embodiment 11. A fluidic droplet pixel according to any of the previous embodiments wherein the gate dielectric layer has a dielectric constant k greater than 1 and no more than 3.5, and each of first pixel dielectric layer and the second pixel dielectric layer has a dielectric constant k of at least 10 and less than 25.

Embodiment 12. A fluidic droplet pixel according to any of the previous embodiments wherein each of the gate dielectric layer, the first pixel dielectric layer and the second pixel dielectric layer has a dielectric constant k of at least 10.

Embodiment 13. A fluidic droplet pixel according to any of the previous embodiments wherein the gate dielectric layer comprises a polymer of structure 4 or 5.

Embodiment 14. A fluidic droplet pixel according to any of the previous embodiments wherein each of the first pixel dielectric layer and the second pixel dielectric layer comprises a polymer of structure 7.

Embodiment 15. A fluidic droplet pixel according to any of the previous embodiments wherein each of the gate dielectric layer, the first pixel dielectric layer and the second pixel dielectric layer comprises a fluorinated polymer.

Embodiment 16. A fluidic droplet pixel according to any of the previous embodiments, wherein the first platform further comprises a buffer dielectric layer disposed on the first substrate between the OTFT and the substrate, optionally wherein the buffer dielectric layer comprises a dielectric polymer.

Embodiment 17. A fluidic droplet pixel according to embodiment 16, wherein the buffer dielectric layer comprises a polymer from structure 4 or 5, or 6.

Embodiment 18. A fluidic droplet pixel according to embodiment 15 or embodiment 16, wherein the buffer dielectric layer is formed from the same chemical composition as the gate dielectric layer.

Embodiment 19. A fluidic droplet pixel according any of the previous embodiments, wherein the buffer dielectric layer of any of embodiments 16-18 is present and the planarization dielectric layer of embodiment 5 or embodiment 6 is present, and wherein the buffer dielectric layer is formed from the same chemical composition as the gate dielectric layer and the planarization dielectric layer.

Embodiment 20. A fluidic droplet pixel according to any of the previous embodiments wherein the organic thin-film transistor is n-type.

Embodiment 21. A fluidic droplet pixel according to any of the previous embodiments wherein the organic semiconductor layer comprises a core-cyanated perylene small molecule of structure 1A or 1B or 2A or 2B or 3A or 3B.

Embodiment 22. A fluidic droplet pixel according to any of the previous embodiments wherein the source, drain, and gate electrodes are made of silver or molybdenum.

Embodiment 23. A fluidic droplet pixel according to any of embodiments 1-21 wherein the pixel electrodes are made of silver or molybdenum or indium (III) thin oxide.

Embodiment 24. An active matrix fluidic droplet driver system comprising a plurality of fluidic droplet pixels according to any of embodiments 1-23.

Embodiment 25. An active matrix fluidic droplet driver system according to embodiment 24, wherein the operating voltage is no more than 40 V.

Embodiment 26. An active matrix fluidic droplet driver system according to embodiment 25, wherein the number of said fluidic droplet pixels is in the range of 50 to 8000.

The invention claimed is:

1. A fluidic droplet pixel, the fluidic droplet pixel comprising: a first platform comprising a first substrate, a first pixel electrode disposed on the first substrate, and a first pixel dielectric layer disposed on the first substrate, the first pixel electrode being disposed between the first substrate and the first pixel dielectric layer, the first platform presenting a first hydrophobic surface opposite the first substrate, the first platform further comprising an organic thin film transistor (OTFT) comprising source and drain electrodes separated by an organic semiconductor channel, and a gate electrode separated from the source and drain electrodes by a gate dielectric layer, said organic thin film transistor being disposed between the first substrate and the first hydrophobic surface, and a second platform comprising a second substrate, a second pixel electrode disposed on the second substrate, and a second pixel dielectric layer disposed on the second substrate, the second pixel electrode being disposed between the second substrate and the second pixel dielectric layer, the second platform presenting a second hydrophobic surface opposite the second substrate; wherein the first hydrophobic surface and the second hydrophobic surface define boundaries of a fluidic channel between the first platform and the second platform; and wherein each of the gate dielectric layer, the first pixel dielectric layer, and the second pixel dielectric layer comprise an organic polymer as the major component; and the organic thin film transistor is configured to provide a switchable voltage bias between the first pixel electrode and the second pixel electrode.

2. The fluidic droplet pixel according to claim 1, wherein the substrate is soda lime glass, or a plastic having a glass transition temperature in the range of 50-250° C.

3. The fluidic droplet pixel according to claim 2, wherein the substrate is a plastic selected from polyethylene terephthalate, polyethylene naphthalate, and a polyimide.

4. The fluidic droplet pixel according to claim 1, wherein the drain electrode of the OTFT is also the first pixel electrode.

5. The fluidic droplet pixel according to claim 1, wherein the drain electrode of the OTFT is in electrical contact with the first pixel electrode.

6. The fluidic droplet pixel according to claim 1, wherein a planarization layer separates the OTFT from the first pixel electrode by a planarization dielectric layer.

7. The fluidic droplet pixel according to claim 6, wherein the planarization layer comprises a polymer from structure 4 or 5, or 6.

8. The fluidic droplet pixel according to claim 6, wherein the planarization dielectric layer is formed from the same chemical composition as the gate dielectric layer.

9. The fluidic droplet pixel according to claim 1, wherein the first hydrophobic surface is provided by a surface of the first pixel dielectric layer, and/or the second dielectric surface is provided by a surface of the second pixel dielectric layer.

10. The fluidic droplet pixel according to claim 1, wherein the first hydrophobic surface is provided by a first hydrophobic layer provided on the first platform separate from the first pixel dielectric layer, and/or the second hydrophobic surface is provided by a second hydrophobic layer provided on the second platform separate from the second pixel dielectric layer.

11. The fluidic droplet pixel according to claim 1 wherein the gate dielectric layer has a dielectric constant k greater than 1 and no more than 3.5, and each of first pixel dielectric layer and the second pixel dielectric layer has a dielectric constant k of at least 10 and less than 25.

12. The fluidic droplet pixel according to claim 1 wherein each of the gate dielectric layer, the first pixel dielectric layer and the second pixel dielectric layer has a dielectric constant k of at least 10.

13. The fluidic droplet pixel according to claim 1 wherein the gate dielectric layer comprises a polymer of structure 4 or 5.

14. The fluidic droplet pixel according to claim 1 wherein each of the first pixel dielectric layer and the second pixel dielectric layer comprises a polymer of structure 7.

15. The fluidic droplet pixel according to claim 1 wherein each of the gate dielectric layer, the first pixel dielectric layer and the second pixel dielectric layer comprises a fluorinated polymer.

16. The fluidic droplet pixel according to claim 1, wherein the first platform further comprises a buffer dielectric layer disposed on the first substrate between the OTFT and the substrate.

17. The fluidic droplet pixel according to claim 16, wherein the buffer dielectric layer comprises a polymer from structure 4 or 5, or 6.

18. The fluidic droplet pixel according to claim 16, wherein a planarization layer separates the OTFT from the first pixel electrode by a planarization dielectric layer, and wherein the buffer dielectric layer is formed from the same chemical composition as the gate dielectric layer and the planarization dielectric layer.

19. The fluidic droplet pixel according to claim 1 wherein the organic thin film transistor comprises a core-cyanated perylene small molecule of structure 1A or 1B or 2A or 2B or 3A or 3B as the organic semiconductor.

20. An active matrix fluidic droplet driver system comprising a plurality of fluidic droplet pixels according to claim 1.

* * * * *